(12) United States Patent
Dhau et al.

(10) Patent No.: US 11,998,958 B2
(45) Date of Patent: Jun. 4, 2024

(54) SYSTEM AND METHOD FOR COATING REMOVAL

(71) Applicant: Molekule, Inc., San Francisco, CA (US)

(72) Inventors: Jaspreet S. Dhau, San Francisco, CA (US); Chatura Wickramaratne, San Francisco, CA (US)

(73) Assignee: Molekule, Inc., San Francisco, CA (US)

( * ) Notice: Subject to any disclaimer, the term of this patent is extended or adjusted under 35 U.S.C. 154(b) by 243 days.

(21) Appl. No.: 17/296,902

(22) PCT Filed: Dec. 10, 2019

(86) PCT No.: PCT/US2019/065514
§ 371 (c)(1),
(2) Date: May 25, 2021

(87) PCT Pub. No.: WO2020/123529
PCT Pub. Date: Jun. 18, 2020

(65) Prior Publication Data
US 2022/0023922 A1   Jan. 27, 2022

Related U.S. Application Data

(60) Provisional application No. 62/891,642, filed on Aug. 26, 2019, provisional application No. 62/777,445, filed on Dec. 10, 2018.

(51) Int. Cl.
*B08B 7/02* (2006.01)
*B08B 7/00* (2006.01)
(Continued)

(52) U.S. Cl.
CPC ............ *B08B 7/005* (2013.01); *B08B 7/0071* (2013.01); *B08B 7/026* (2013.01); *B08B 7/028* (2013.01);
(Continued)

(58) Field of Classification Search
None
See application file for complete search history.

(56) References Cited

U.S. PATENT DOCUMENTS 3,623,909 A   11/1971   Jones
3,849,063 A   11/1974   Eichenlaub
(Continued)

FOREIGN PATENT DOCUMENTS

WO   2003103861 A2   12/2003

OTHER PUBLICATIONS

Best Practices: The Case of the 2 Towers, Coatings Industry News, Nov. 6, 20213.
(Continued)

*Primary Examiner* — Jethro M. Pence
(74) *Attorney, Agent, or Firm* — Jeffrey Schox; Randy Mehlenbacher

(57) ABSTRACT

A system for removing a coating from an underlying layer can include a wave-based weakening system configured to weaken the coating by decreasing a coupling force between the coating and the substrate, a coating removal mechanism configured to remove the weakened coating from the underlying layer, and a sensor configured to determine a property associated with the coating. A method for removing a coating from an underlying layer can include generating a weakened coating and removing the weakened coating.

14 Claims, 7 Drawing Sheets

(51) Int. Cl.
 *B08B 7/04* (2006.01)
 *B08B 13/00* (2006.01)
(52) U.S. Cl.
 CPC .............. *B08B 7/04* (2013.01); *B08B 13/00* (2013.01); *B08B 2220/04* (2013.01)

(56) References Cited

U.S. PATENT DOCUMENTS

| | | | |
|---|---|---|---|
| 4,836,858 A | 6/1989 | Reinhart | |
| 4,858,264 A | 8/1989 | Reinhart | |
| 5,328,517 A | 7/1994 | Cates et al. | |
| 5,613,509 A | 3/1997 | Kolb et al. | |
| 5,864,114 A | 1/1999 | Fukuda | |
| 6,827,791 B2 | 12/2004 | Ruffa et al. | |
| 8,442,391 B2 | 5/2013 | Ericson | |
| D735,306 S | 7/2015 | Ericson | |
| 9,352,355 B1* | 5/2016 | Jackson | B24C 1/00 |
| 9,387,511 B1* | 7/2016 | Jackson | B08B 7/0035 |
| 9,868,179 B2* | 1/2018 | Toyosawa | B23K 26/04 |
| 10,160,260 B2 | 12/2018 | Ericsson | |
| 11,135,681 B2* | 10/2021 | Toyosawa | B23K 26/16 |
| 2004/0197433 A1 | 10/2004 | Terada et al. | |
| 2004/0221876 A1 | 11/2004 | Waleh et al. | |
| 2007/0001070 A1 | 1/2007 | Ericson | |
| 2010/0275949 A1 | 11/2010 | Ruhge et al. | |
| 2015/0076125 A1 | 3/2015 | Toyosawa et al. | |
| 2021/0394308 A1* | 12/2021 | Toyosawa | B23K 26/06 |

OTHER PUBLICATIONS https://eco-strip.com, Paint-Stripping Faster, Cleaner, Safer with Speedheater, downloaded from the internet on Jun. 3, 2021.
https://www.house-painting-info.com/articles/safe-lead-paint-removal/#.XcRXSpJKii4, downloaded from the internet on Jun. 3, 2021.
https://www.silentpaintremover.com/, downloaded from the internet on Jun. 3, 2021.
Salta M. et al. "Bubbles vs biofilms: A novel method for the removal of marine biofilms attached on antifouling coatings using an ultrasonically activated water stream".

\* cited by examiner

SYSTEM AND METHOD FOR COATING REMOVAL

CROSS-REFERENCE TO RELATED APPLICATIONS

This application claims the benefit of U.S. Provisional Application No. 62/777,445, filed 10 Dec. 2018, and U.S. Provisional Application No. 62/891,642, filed 26 Aug. 2019, each of which is incorporated in its entirety by this reference.

STATEMENT OF GOVERNMENT SUPPORT

This invention was made with government support under Award Number [WP18-1347] awarded by the Strategic Environmental Research and Development Program (SERDP), DOD's environment research program. The government has certain rights in the invention.

TECHNICAL FIELD

This invention relates generally to the coating removal field, and more specifically to a new and useful system and method in the coating removal field.

BACKGROUND

Typically, coatings are removed using chemical treatments. These chemical treatments are often toxic and hazardous to the environment. Thus, there is a need in the coating removal field to create a new and useful system and method for coating removal. This invention provides such new and useful coating removal mechanism and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
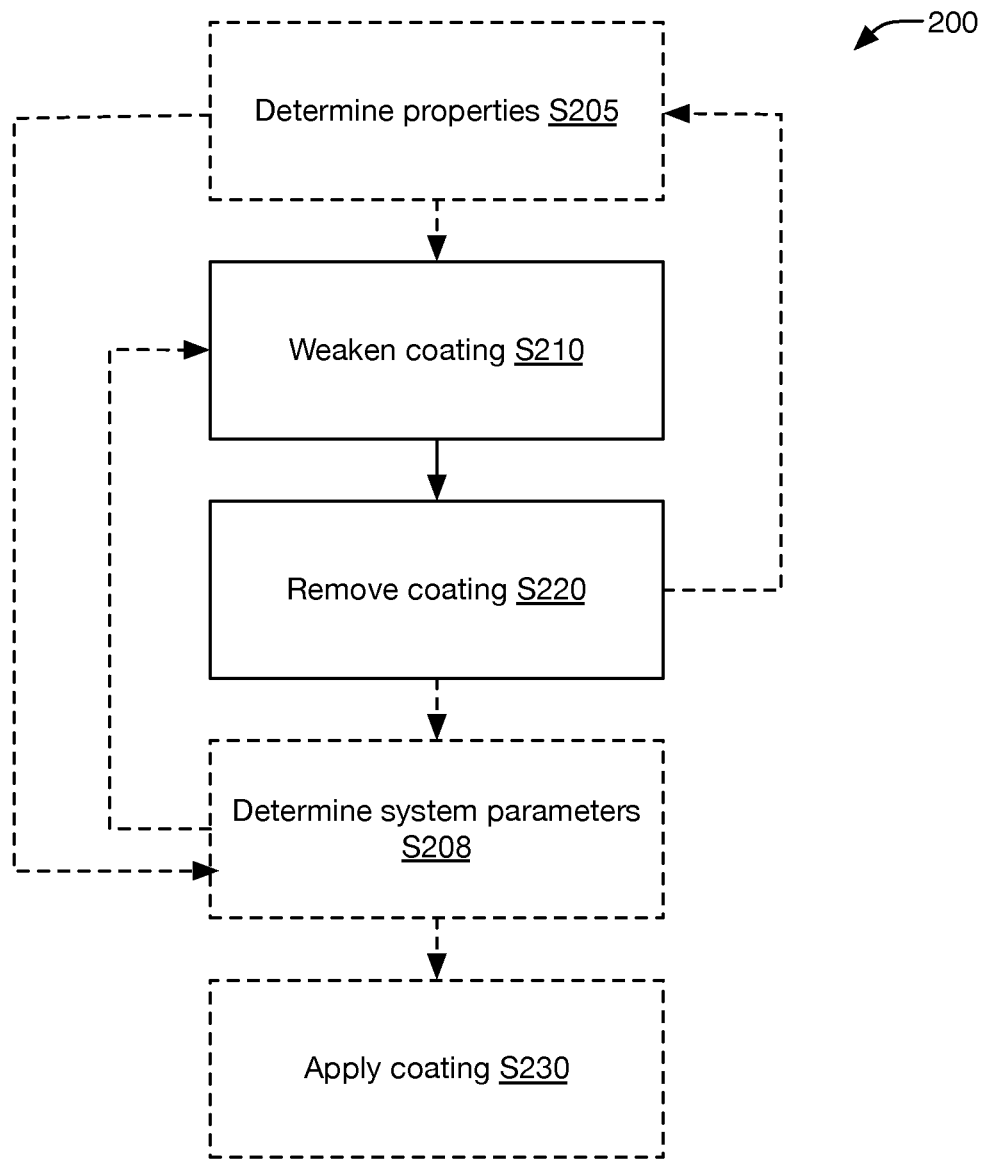
FIG. 1 is a schematic representation of the method for coating removal.
Figure 2:
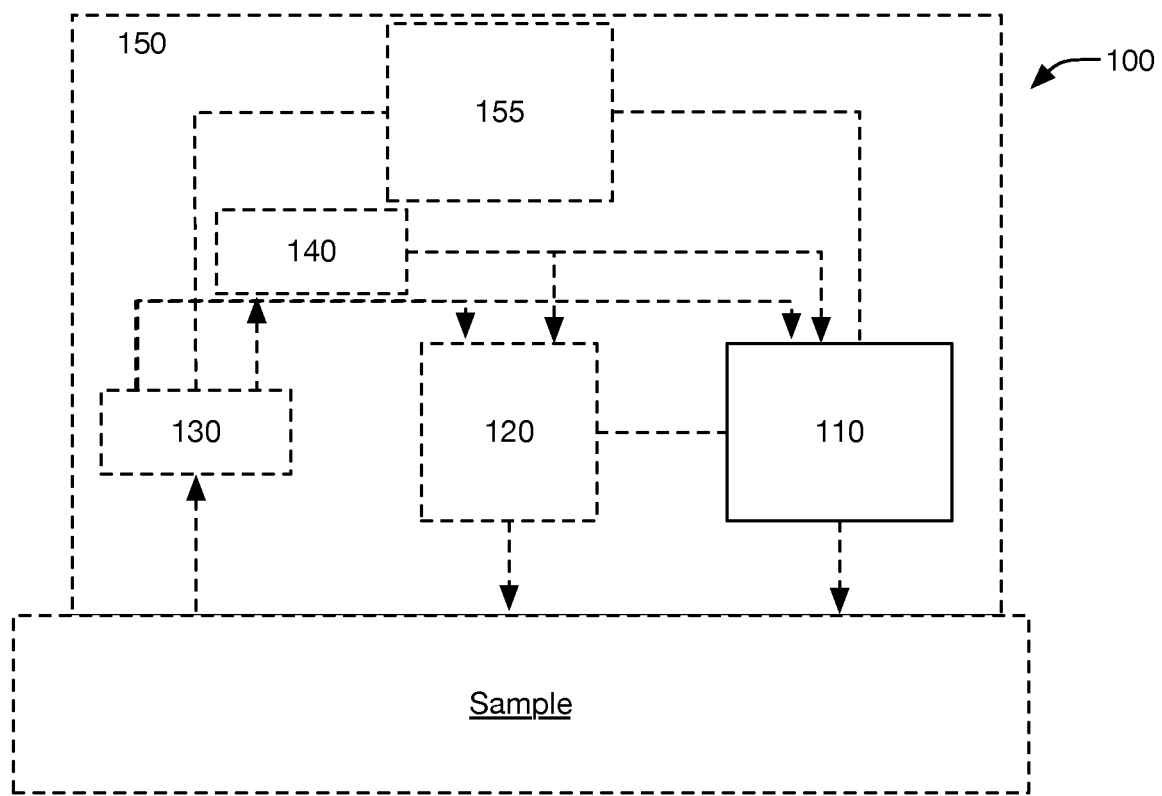
FIG. 2 is a schematic representation of the system for coating removal.

As shown in FIG. 2, the system 100 for coating removal preferably includes a coating weakening system 110, and optionally includes a coating removal mechanism 120. The system can optionally include sensors 130, a computing system 140, a housing 150, and/or any other suitable elements. As shown in FIG. 1, a method 200 for coating removal preferably includes weakening coating bonds S210 and removing the coating S220. The method can additionally or alternatively include determining properties associated with the sample S205, applying coating S230, and/or any other suitable elements. The system and method function to remove coatings from coated samples. The method is preferably performed using the system, but can additionally or alternatively be performed using any suitable system.

The coated sample preferably includes a substrate and one or more coatings (e.g., exterior coatings, primers, etc.). The coating(s) are preferably elastomeric coatings (e.g., polyurethane, polyamide, polyimide, etc.), but can additionally or alternatively be epoxy or any suitable coating(s) and/or coated sample. The coated sample can be planar, curved (e.g., concave, convex), uneven, or have any other suitable geometry. The coating can be uniform (e.g., uniform thickness, uniform composition, etc.) and/or nonuniform (e.g., varying thickness, varying composition, etc.). The coated sample can be a single unified piece of material, two or more pieces of material (e.g., substrates) connected together such as with fasteners (e.g., rivets, bolts, screws, etc.), or have any other suitable number of coatings. When the coated sample includes multiple pieces of material, the materials can be: stacked, arranged adjacent each other, or be otherwise arranged. The system can be flat, curved, flexible, modular, conformal, and/or arranged in any suitable manner to weaken and remove the coating from the coated surface.

In a first embodiment of the technology, the technology can be implemented in a handheld (e.g., manually operated) form factor. In this embodiment, the system is preferably light-weight (e.g., less than 5.1 pounds), portable (e.g., total system foot-print less than 4 inches high×10 inches long×5 inches wide), and ergonomic (e.g., includes a grip and/or handle for user operation, operable using a single hand, etc.). In examples, the system can attach to a handheld device, can be manufactured in a handheld device (e.g., housing), and/or a handheld coating removal system can be designed in any suitable manner. In examples, a handheld coating removal system can be designed to include components that met lower specifications (e.g., lower maximum powers, fewer wavelengths, etc.) but can be configured to compensate for the lower specifications (e.g., by operating the system for longer durations). However, a handheld coating removal system can be configured in any suitable manner.

Figure 10A:
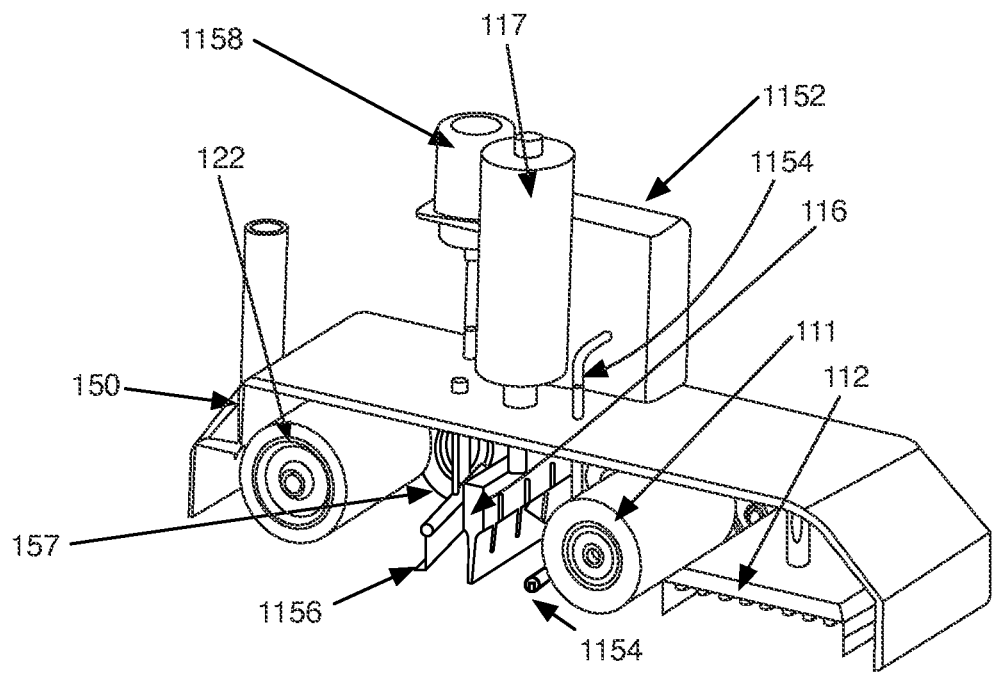
FIGS. 10A and 10B are schematic representations of embodiments of the system.
Figure 10B:
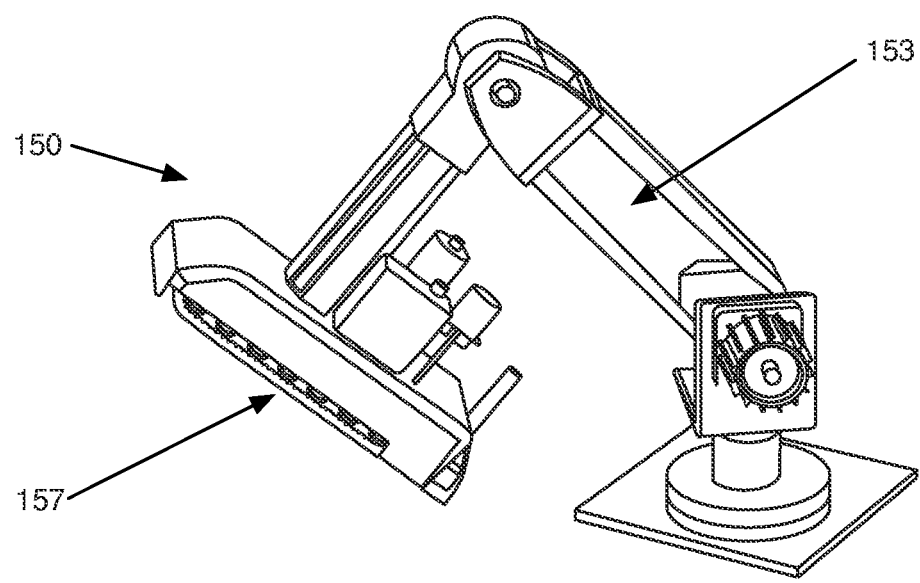

In a second embodiment of the technology, the technology can be implemented autonomously and/or semi-autonomously. In these embodiments, the technology preferably operates independently of a user. For example, the technology can run based on a predetermined set of instructions (e.g., set at the time of manufacture, set based on the coated sample, set for each particular coated sample, etc.). However, these embodiments can be operated remotely, manually, and/or in any suitable manner. In a first specific example, the technology can be suspended from/mounted to a guide system (e.g., guide rail, guide arm, x/y/z gantry, etc.). In this example, the guide system can be used to position the technology at suitable locations of the coated sample. In a second specific example, as shown in FIG. 10B, the technology can be coupled (e.g., connected, mounted) to a robot arm (e.g., robot arm with between one and six degrees of freedom, wherein the degrees of freedom can be translational and/or rotational), wherein said robotic arm can enable the technology to be applied to any suitable location(s) of the coated sample. In a third specific example, as shown in FIG. 10A, the technology can be attached to a robot, wherein the robot can be removably coupled the coated sample (e.g., via suction, magnets, spikes, adhesion, gravity, etc.). In these embodiments, the technology can include a movement mechanism (e.g., wheels, treads, suction cup balls, etc.) that can enable the technology to traverse the coated sample (e.g., randomly, in a raster pattern, in a boustrophodenric pattern, deterministically such as following a deterministic map, etc.). However, the technology can be implemented in any suitable manner.

2. Benefits.

The system and method can confer several benefits over conventional coating removal mechanisms.

First, specific variants of the technology can leverage nontoxic processes (e.g., infrared light sources and/or ultrasonic sources) to weaken and remove the coating bonds (to the substrate and/or underlying layers). Since these methods do not produce byproducts or waste (e.g., residual chemical solvent/solvent fumes), they are safer and less toxic options for coating removal.

Figure 9A:
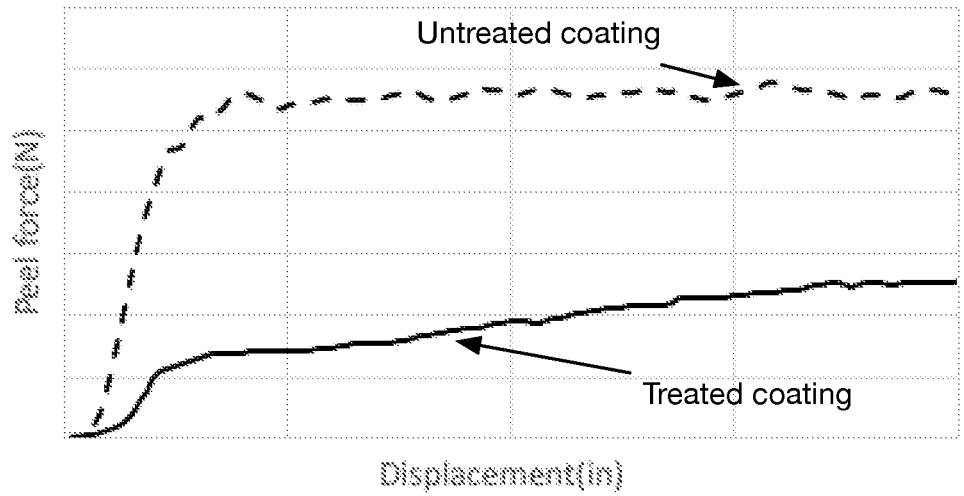
FIGS. 9A and 9B are schematic representations of example changes in force used to remove a coating that has not been treated with a coating weakening system and a coating that has been treated with one or more coating weakening systems.
Figure 9B:
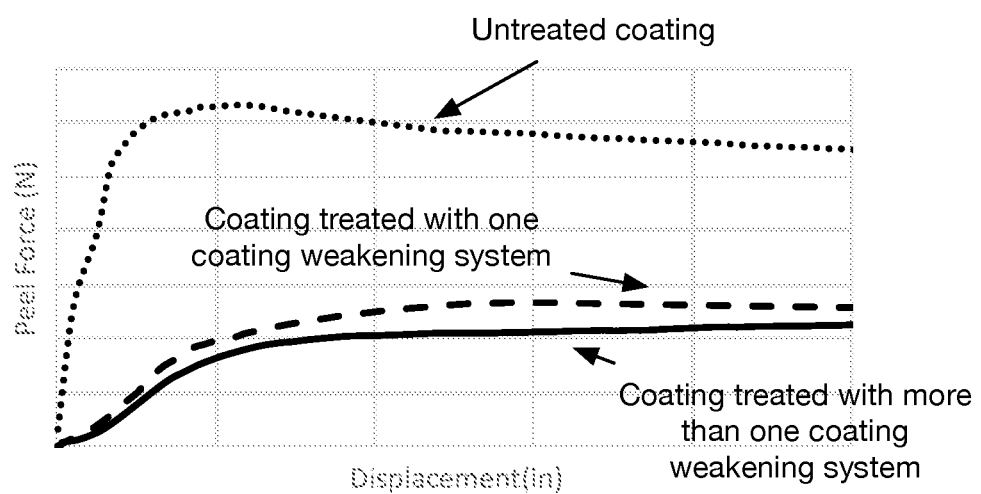

Second, specific variants of the technology can facilitate facile removal of one or more coatings from a sample. In a specific example, the use of a coating weakening system (e.g., infrared light source, ultrasonic emitter, noncontact thermal mechanism, etc.) can decrease the amount of force necessary to remove a coating, for example as shown in FIG. 9A. In a second specific example, as shown in FIG. 9B, the use of more than one coating weakening system (e.g., an infrared and an ultrasonic coating weakening system) can further decrease the amount of force necessary to remove a coating (e.g., weaken the coating coupling force more than a single coating weakening system).

Figure 8:
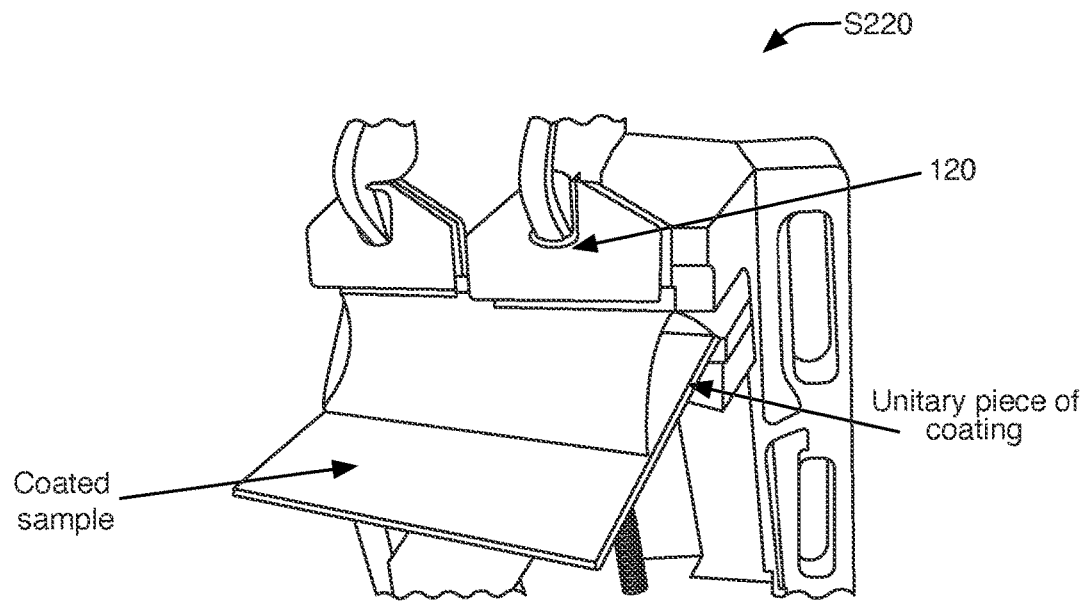
FIG. 8 is a schematic representation of an example of removing a coating in a single unitary piece.

Third, variants of the technology can nondestructively remove the coating from the coated sample. In a specific example, the technology can remove the coating in a single unitary piece or section (for example as shown in FIG. 8). Removing the coating in a unitary piece can decrease the amount of waste generated, improve the extent of coating removal, and facilitate recycling of the removed coating.

Fourth, variants of the technology can ensure that the underlying layers (e.g., substrate, primer, lower coating, etc.) are not damaged. In examples, using nondestructive (e.g., low energy, targeted, etc.) mechanisms for coating weakening (such as illumination with light, radiative heating, ultrasonic emitters, etc.) and coating removal (such as friction wheels) can ensure that the underlying layers remain intact.

However, variants of the technology can confer any other suitable benefits.

3. System.

The system for coating removal preferably includes one or more coating weakening systems 110 and optionally, one or more coating removal mechanisms 120, but can additionally or alternatively include sensors 130, computing system 140, housing 150, and/or any other suitable elements. The housing is preferably a unitary housing to which all elements are mounted, but additionally or alternatively the system can include one or more housings with one or more elements in each housing, and/or be configured in any suitable manner.

3.1 Coating Weakening System.

The coating weakening system 110 (e.g., bond weakening system) preferably functions to decrease (e.g., weaken) a coupling force (e.g., the bonds, interactions, etc.) between the coating and the underlying layer (e.g., primer, substrate, underlying coating, etc.). However, the coating weakening system 100 can function to weaken bonds within the coating(s), between adjacent coatings, at the interface (e.g., between the coating and the underlying layer), or weaken any other suitable bond.

The coating weakening system no is preferably coupled (e.g., attached) to the housing. The coating weakening system can be coupled to one or more of a top of the housing, a side of the housing, a bottom of the housing, and/or can be attached to the housing in any suitable manner. The coating weakening system can be coupled to the housing by fasteners (e.g., screws, bolts, adhesives, etc.), by construction (e.g., the coating weakening system can be integrated into the housing, the housing can retain the coating weakening system, etc.), by one or more bias mechanisms, and/or in any suitable manner. The coating weakening system is preferably oriented toward an opening defined by the housing. However, the coating weakening system can be oriented toward the top of the housing, the bottom of the housing, the sides of the housing, the sample, and/or in any suitable direction. The coating weakening system is preferably arranged behind one or more sensors. However, the coating weakening system can be arranged in front of, adjacent to, be integrated with, and/or be arranged with any suitable orientation relative to the sensors. The coating weakening system is preferably arranged in front of the coating removal mechanism. However, the coating weakening system can be arranged behind, adjacent to, integrated with, above, below, and/or arranged in any suitable manner relative to the coating removal mechanism. In operation, the coating weakening system preferably opposes the substrate across the coating, and is preferably coupled to the coating (e.g., via a working fluid or coupling medium, such as air or water). However, the coating weakening system can be otherwise arranged.

The coating weakening system preferably opposes the substrate across the coating (and/or opening) at a fixed height, but can additionally or alternatively be set to a dynamically adjustable height (e.g., in response to a feedback loop, based on detection of foreign contamination on the coating, etc.), depend on coating properties or sample properties associated with the coating or sample (e.g., coating thickness, height, material composition, spatial variations in the coating across the sample, contact pressure, etc.), and/or set in any suitable manner. In specific examples of the system including more than one coating weakening system, the heights for each of the coating weakening systems can be set the same way, to the same height, to different heights (e.g., based on sample properties, coating properties), some can be at the same height and some at different heights, and/or the heights can be set in any suitable manner.

In variants, the coating weakening system can be reorientable. This can be particularly useful when the coated samples have nonuniform coating thicknesses or are curved coated samples, but can additionally or alternatively be used to accommodate for different angles of attack or otherwise used. For example, one end of the coating weakening system can be higher than another end of the coating weakening system. In another example, the orientation of the coating weakening system can be manually or dynamically arranged to match the coated sample geometry (e.g., by biasing the coating weakening system within the housing). However, the coating weakening system can be oriented in any suitable manner.

The coating weakening system is preferably a wave-based weakening system (e.g., wave-based bond weakening system, wave-based coating weakening system), but can alternatively or additionally be an electrical coating weakening system, an interference coating weakening system (e.g., using laser interference), a thermal coating weakening system, and/or be any other suitable mechanism for coating (and/or interfacial bond) weakening. Each coating weakening system can include one or more of the same or different types of wave-based weakening systems.

The wave-based coating weakening system can include wave emitters. The wave emitters can include: light sources 112 (e.g., light emitters), sound sources 116 (e.g., senders, horns, emitters, etc.), or any other suitable wave source. The coating weakening system can optionally include optics (e.g., lenses), beamforming arrays, waveguides, or any other suitable auxiliary components. Each wave-based coating weakening system can include one or more of the same or different types of wave emitters.

The wave-based coating weakening system preferably weakens the coating and/or bonds using waves with wave parameters that are related to (e.g., determined based on, adjusted based on) the sample properties In one example, the wave-based coating weakening system can emit wavelengths that are matched to (e.g., selectively absorbed by, selectively transmitted by, selectively reflected by) the coating to be removed (e.g., optical resonances, vibrational resonances, phonon resonances, etc. of the coating). In another example, the wave-based coating weakening system can emit wavelengths that are selectively absorbed by the layer adjacent to the coating to be removed, such that the resultant heat generated by the adjacent layer can damage the coating to be removed. However, the wave parameters can be unrelated to the sample properties and/or can be otherwise suitably defined.

The coating weakening system is preferably associated with coating weakening system parameters. The coating weakening system parameters are preferably system operation parameters (e.g., operation parameters), such as position (e.g., x/y/z; relative position such as relative to the coating, to the opening, to other components, etc.; etc.), orientation (e.g., Θ, φ; relative orientation such as relative to the coating, to the coated sample, to the opening, to other components, etc.; etc.), power output (e.g., maximum power output), amplitude, frequency, wavelength, percentage of maximum power output (e.g., 1%, 5%, 10%, 20%, 30%, 40%, 50%, 60%, 70%, 80%, 90%, 95%, 99%, 100%, etc.), flux at the coating surface (e.g., irradiance, acoustic flux), dwell time, duration of operation (e.g., 1 s, 2 s, 4 s, 6 s, 8 s, 10 s, 12 s, 16 s, 20 s, 30 s, 60 s, 120 s, etc.), duration since operation (e.g., the amount of time between weakening the coating and removing the coating such as 1 s, 2 s, 4 s, 10 s, 20 s, 30 s, 60 s, 2 min, 5 min, 10 min, 20 min, 30 min, 1 hr, etc.), power density, wave-spot size, wave focal distance, speed (e.g., relative speed of the system relative to the coating), mode of operation (e.g., contact mode, noncontact mode), coupling medium (e.g., type, presence, amount, etc.), and/or any other suitable operation parameter.

The coating weakening system parameters can be predetermined, dynamically determined (e.g., based on a feedback loop, iteratively, etc.), or otherwise determined.

The coating weakening system parameters are preferably determined based on the current sample properties (e.g., sample properties related to a specific location of the sample, related to the coating, etc.), but can additionally or alternatively be determined based on target sample properties, previous sample properties, be unrelated to the sample properties, be predetermined, be static, be determined based on ambient environment parameters (e.g., ambient humidity, temperature, pressure, etc.), and/or be determined in any other suitable manner.

Sample properties or coating properties that can be used to determine the system parameters include: coating material, coating material properties (e.g., melting temperature, a vaporization temperature, an acoustic resonance frequency, thermal expansion coefficient, etc.), coating location, coating thickness, substrate composition, substrate location, substrate thickness, and/or any other suitable parameter. The system parameters can be determined based on the sample properties by: selection (e.g., from a predetermined chart or graph), calculation (e.g., using an equation relating the sample properties to the system parameters), estimation (e.g., using a neural network trained to estimate the system parameters for a given set of sample properties), iterative determination (e.g., using a closed-feedback loop, such as based on the force required to remove the coating), or otherwise determined.

In one example, the coating weakening system parameters are dynamically determined by operating the coating weakening system according to a first set of parameters (e.g., initial parameters), monitoring the coating for measurements indicative of coating and/or bond weakening (e.g., changes in acoustics, visual signs of coating separation, etc.), optionally comparing the measurements to a set of target values, and dynamically adjusting the operation parameters based on the comparison (e.g., increasing the amplitude when the bonds are not weakening fast enough; decreasing the amplitude when the bonds are weakening too quickly or when other coating layers or the substrate are showing signs of undesired damage). However, the operation parameters can be otherwise determined.

The coating weakening parameters (e.g., bond weakening parameters) preferably include wave parameters. The wave parameters are preferably characteristics that describe the wave. Wave parameters can include: wave intensity (e.g., power density, spectral power density, amplitude, etc.), propagation distance (e.g., distance wave can travel before being attenuated by a fixed amount, by a percentage relative to the initial wave intensity, to below a threshold intensity, etc.), time (e.g., duration of exposure, fixed number of wavelengths, duration since exposure, etc.), wavelength/frequency of the wave (e.g., radial frequency, linear frequency, wherein frequency and wavelength are related by the equation $\lambda * f = v$, wherein $\lambda$ is the wavelength, f is the frequency, and v is the speed of propagation of the wave, etc.), coupling medium (e.g., air, vacuum, index of refraction matched material between wave-based coating bond weakening system and coating, partially index of refraction matched material between wave-based coating bond weakening system and coating, liquids such as: water, gels, solvents, etc.), collimation state (e.g., focused waves, collimated waves, partially focused waves, etc.), and/or any suitable wave parameters.

The wave based coating weakening system is preferably configured to emit a range of wavelengths (e.g., range 0.7-8 μm, 1-3 μm, 3-6 μm, 5-20 μm, 1-3 μm, 400-700 nm, 10-400 nm, >20 μm, <10 nm, 4.8-16.5 mm, <1.9 cm, >1.9 cm, etc.). The wavelength(s) can depend on the environmental conditions (e.g., humidity, temperature, elevation, etc.), the coupling medium, sample properties, and/or any suitable property. Additionally or alternatively, the wave based coating weakening system can be configured to be a subset of the range of wavelengths, (e.g., a continuous range such as: 1.4-3 µm, 0.7-1.4 µm, 3-4 µm, 1-6 µm, 8-10 µm, 5-8 kHz, 25-50 kHz, etc.; discrete wavelengths such as: 3, 4.2, 5.7, 8.3 µm, 22.2 kHz, 50 kHz, etc.; can be non-overlapping ranges such as: 3-4 & 6-8 µm, 15-20 kHz & 45-50 kHz, etc.) and/or can include any suitable wavelengths. However, additionally or alternatively the wave based coating weakening system can be configured to emit a tunable wavelength range (e.g., dependent, for example, on the system temperature, the sample temperature, the electrical current produced by the power supply, etc.), fixed wavelengths (e.g., 9.4, 10.6 µm, 30 kHz, etc.), and/or any suitable set of wavelengths. When the system includes multiple wave based coating weakening systems, each wave based coating weakening system preferably emit a different set of wave parameters (e.g., overlapping or nonoverlapping). However, multiple wave based coating weakening systems on the same system can emit the same set of wave parameters.

The intensity of the waves is preferably defined as a percentage of maximum output power (e.g., 100%, 95%, 80%, 67%, 50%, 40%, 25%, etc.), but additionally or alternatively can be dynamically changing (e.g., be modulated at a predetermined rate to generate a specific wear profile such as: specific temperature profile, specific cavitation profile, etc.); can be defined as an absolute power density (e.g., 1 W/m$^2$, 10 W/m$^2$, 1 W/cm$^2$, etc.); and/or can be determined in any suitable manner.

The time (e.g., dwell time) that the waves are incident on the sample (e.g., a specific region of the sample, the sample as a whole) is preferably determined based on the wavelength and the intensity (e.g., 8 s for 95% intensity and 3 µm, 20 s for 80% intensity and 60 kHz, etc.). However, the time can be a fixed value (e.g., 1, 2, 5, 10 s etc.), depend on the sample properties (e.g., 10 s for 1 mm thick, 20 s for 1.5 mm thick coating, 15 s for polyurethane coating, etc.), dynamically update (e.g., detect decrease in intensity and increase the duration of exposure), and/or be any other suitable timing.

The coating weakening system can optionally be used with a coupling medium 115 that functions to couple the wave based coating weakening system with the coating and/or sample. In specific variants, the coupling medium can function to prevent damage caused by the coating weakening system (e.g., chemical wear, thermal wear, etc.) to the coating (and/or underlying layers). The coupling medium can be applied to the coating surface before the coating weakening system passes over the coating surface with any suitable timing. In a specific example, the coupling medium can be applied to the coating surface immediately, a predetermined amount of time (e.g., 1 s, 2 s, 5 s, 10 s, 30 s, 1 min, 2 min, 10 min, 1 hour, etc.), and/or with any suitable timing before or after the coating weakening system passing over the coating surface. The coupling medium can be applied adjacent to the coating weakening system (e.g., from an outlet of a coating dispenser that is adjacent to the coating weakening system), in-situ with the coating weakening system, by the coating weakening system, and/or in any suitable location. In a specific example, a portion of and/or the entire coating surface can be coated with coupling medium before the coating weakening system passes over the sample region. In variants, the coupling medium can be reused (e.g., collected from the coating surface, filtered, reused, recirculated, etc.).

In specific example, the system can include a coupling medium reservoir 1152 and a coupling medium dispenser 1154. The coupling medium reservoir is preferably configured to hold the coupling medium. The coupling medium reservoir can include: a rigid container, a flexible container (e.g., a bag), or be otherwise configured. The coupling medium dispenser is configured dispense the coupling medium. The coupling medium dispenser can include: a pump (e.g., a piston pump, a diaphragm pump), a pressurization system fluidly connected to the coupling medium reservoir, gravity (e.g., wherein coupling medium dispensation is driven by hydrostatic pressure), and/or any other suitable dispensation mechanism. An outlet of the coupling medium dispenser is preferably arranged in front of the wave-based coating weakening system (e.g., proximal the leading edge of the system, relative to the wave-based coating weakening system); however, the outlet can be arranged in front of the system, and/or at any suitable location. However, the coupling medium can be applied to the entire coated sample (e.g., before coupling the system to the sample), and/or can be applied to the sample in any suitable manner.

The system can optionally include a coupling medium remover 1156 that functions to remove the coupling medium from the coating. The system can include one or more coupling medium removers (e.g., an array of coupling medium removers). The coupling medium remover can be: rollers, brushes, squeegees/squilgees, suction mechanisms (e.g., vacuum), wipers, blades, mop, sponge, auger (e.g., screw auger), towel, pressure mechanism (e.g., blower such as air blower), and/or any suitable coupling medium remover can be used. The coupling medium remover can be arranged: between coating weakening systems, between a coating weakening system and a sensor, between a coating weakening system and a coating removal mechanism, at the front of the housing, at the back of the housing, and/or at any suitable location. The coupling medium remover can operate automatically (e.g., under control from a computing system, operable in response to a sensor reading, etc.), semi-automatically, and/or manually.

In variants, the coupling medium remover 1156 can include one or more coupling medium collectors that function to collect the coupling medium (e.g., from the coating, from the coupling medium remover). The collected coupling medium can be reused (e.g., recirculated) and/or discarded. In specific examples, the collected coupling medium can be filtered (e.g., using a filter), washed, purified, distilled, treated (e.g., UV treatment), and/or otherwise suitable processed before being reused. However, the collected coupling medium can be reused without being processed. In a specific example, the coupling medium collector can be a vacuum mechanism. The vacuum mechanism can optionally include one or more filters to clean (e.g., remove contaminants from) the coupling medium enabling the coupling medium to be reused (e.g., recirculated). The coupling medium collector is preferably connected to the coupling medium remover. However, the coupling medium collector can be connected to the coating weakening system, the housing, the coating removal mechanism, separate from the system, and/or arranged in any suitable manner. In examples, the coupling medium reservoir, coupling medium remover, coupling medium dispenser, and coupling medium collector can collectively define a coupling medium recirculatory 1158. However, the coupling medium recirculator can be defined in any suitable manner.

In specific examples, the collimation state can be controlled using lenses and/or wave-based coating weakening system design architecture (e.g., how pointed the wave-based coating weakening system is, distance between the wave-based coating weakening system and the coating, etc.).

The wave-based coating weakening system can emit and/or generate: transverse waves (e.g., electromagnetic waves), longitudinal waves (e.g., sound waves), combination waves (e.g., waves that include both transverse and longitudinal components, water wave, etc.), surface waves, and/or any suitable type of wave. Examples of wave-based coating weakening systems that can be used include: infrared light sources, laser, microwave, ultrasound, and/or any other suitable mechanism.

In a first embodiment, the wave-based coating weakening system (e.g., transverse wave bond weakening system, transverse wave coating weakening system, transverse wave weakening system) functions to illuminate and/or irradiate the coating (and/or sample) with transverse waves (e.g., electromagnetic radiation 114). The electromagnetic radiation can: increase the temperature of the coating(s), leading to thermal expansion of the coating(s), thereby weakening a subset of bonds in the sample; can drive reactions (e.g., photolytic reactions at the interface); and/or can decrease the coupling force (e.g., weaken the bonds) in any suitable manner. The wave-based coating weakening system preferably heats the coating (and/or coated sample) to <600° C., but can additionally or alternatively heat the coating (and/or coated sample) to a temperature less than the coating and/or coating material's melting temperature, a temperature that depends on the substrate (e.g., below a substrate-damaging temperature, below a substrate phase change temperature, etc.), a temperature that depends on the sample properties (e.g., thickness, composition, etc.), a temperature that depends on the target coating removal, and/or heat the sample to any suitable temperature.

Figure 3:
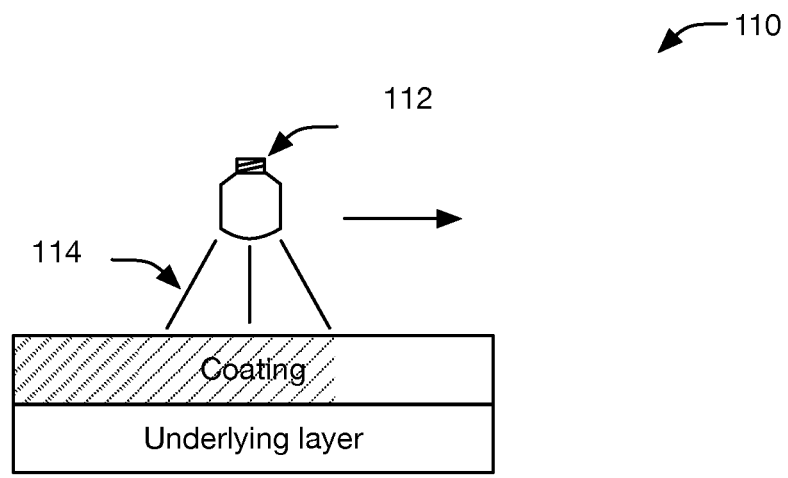
FIG. 3 is a schematic representation of an example coating weakening system.

The transverse waves are preferably electromagnetic waves (e.g., electromagnetic radiation), example shown in FIG. 3. The transverse waves are preferably generated by the light emitter (e.g., light source), but can be otherwise generated. The electromagnetic waves are preferably infrared (IR) (e.g., wavelength is between 0.7 µm and 1.00 mm), but can additionally or alternatively have any suitable wavelength. In a set of specific example, the electromagnetic radiation can include near-infrared radiation (e.g., wavelength and/or range of wavelengths between 0.7-1.4 µm), short-wave infrared radiation (e.g., wavelength and/or range of wavelengths between 1.4-3 µm), mid-wave infrared radiation (e.g., wavelength and/or range of wavelengths between 3-8 µm), long-wave infrared radiation (e.g., wavelength and/or range of wavelengths between 8-15 µm), far infrared radiation (e.g., wavelength and/or range of wavelengths between 15-1000 µm). However, the electromagnetic radiation can be visible (e.g., wavelength and/or range of wavelengths between 400-700 nm), ultraviolet (e.g., wavelength and/or range of wavelengths between 10-400 nm), microwave (e.g., wavelength and/or range of wavelengths between 1 mm to 1 m), and/or any suitable electromagnetic radiation can be used. In a specific example, the wavelength of the transverse wave is chosen to match a resonance in the coating (e.g., the wavelength is absorbed by the coating). In this specific example, when the coating is a thick elastomeric polyurethane coating, the transverse waves are chosen to have a wavelength in the range of 1-3 µm to induce the greatest thermal heating. However other wavelengths (and/or wavelength ranges) can be selected for the same or different coating material.

The electromagnetic radiation preferably has a maximum intensity of 5400 W. However, the electromagnetic radiation can have any suitable maximum intensity. In operation, the intensity of the electromagnetic radiation can be selected based on the sample properties/parameters, time (e.g., duration required to achieve a target temperature), lifetime (e.g., anticipated lifetime of the light sources based on the intensity), and/or otherwise selected. The operation intensity can be any suitable percentage between 0-100% of the maximum intensity.

The transverse waves are preferably incoherent. More preferably, the transverse waves are generated by an light source (e.g., LED). However, additionally or alternatively the transverse waves can be produced by coherent sources (e.g., lasers such as: quantum cascade lasers, $CO_2$ lasers, solid state lasers; nonlinear processes such as: nonlinear frequency conversion, optical parametric amplification; etc.), thermal emission (e.g., incandescent lamps, sun light, etc.), and/or be generated by any other suitable source. The transverse waves are preferably unpolarized, but additionally or alternatively can be linearly polarized, circularly polarized, elliptically polarized, randomly polarized, and/or have any suitable polarization state.

In specific examples in which the wave-based coating weakening system can emit more than one transverse wave or range thereof (e.g., includes more than one light source, includes more than one cassette, light source can be dynamically adjusted to generated more than one transverse wave simultaneously), the operation parameters (e.g., wavelength; intensity; time such as duration of illumination; etc.) for each of the transverse waves can be the same and/or different. In this specific example, one transverse wave can be configured for one coating material (e.g., emit electromagnetic radiation with a wavelength range that matches an absorption of the coating material such as a wavelength range between 1-3 µm) and another transverse wave can be configured for another coating material (e.g., emit electromagnetic radiation with a wavelength range that matches an absorption of another coating material such as a wavelength range between 3-8 µm). In this specific example, the form factor of the light sources can be cassettes (e.g., flat cases, cartridges), filaments, thin films, foil (e.g., metallic foil), and/or any suitable form factor can be used.

In a first variant including one or more light sources, the light sources can be modular and replaceable. For example, each light source (e.g., set of light sources) can each be in the form of modular cassettes, which can be removed and replaced with other cassettes retaining other light sources. In a specific example, the first cassette of light emitters can correspond to short-wave IR emitters (e.g., light sources that emit radiation including wavelengths 1.4-3 µm) and the second cassette can correspond to mid-wave IR emitters (e.g., lights sources that emit radiation including wavelengths 3-8 µm). Each cassette (and/or set of light sources) can include 1 or more light emitters (e.g., LEDs) arranged in a circle, in an array, or in any other suitable arrangement. In a second variant, the wave-based coating weakening system can include more than one type of light emitter (e.g., a short-wave IR emitter and a mid-wave IR emitter) concurrently mounted to the system.

Figure 5:
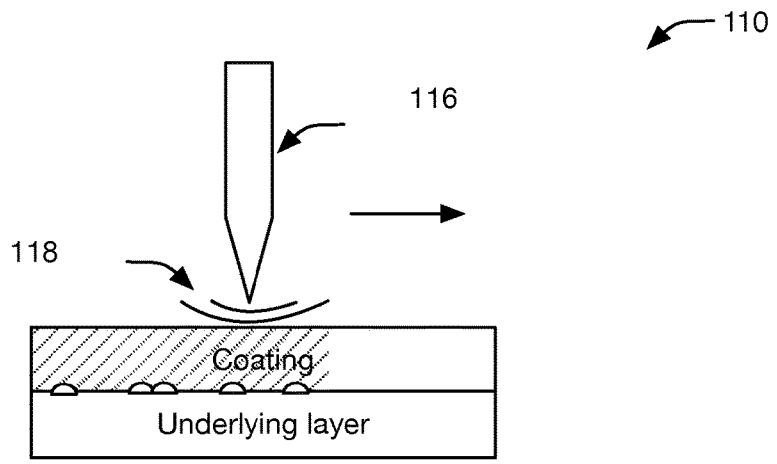
FIG. 5 is a schematic representation of an example coating weakening system.

In a second embodiment of the wave-based coating weakening system, the coating weakening system (e.g., longitudinal wave coating weakening system, longitudinal weakening system, longitudinal coating weakening system) preferably functions to induce cavitation wear in the coating (e.g., at the interface between the coating and the underlying layer). The longitudinal waves are preferably sound waves, and more preferably ultrasonic waves 118 (e.g., emitted from an ultrasonic emitter 116), for example as shown in FIG. 5. However, additionally or alternatively the longitudinal waves can be a pressure wave and/or any suitable longitudinal wave. The longitudinal waves are preferably generated by a sound source(s) (e.g., an ultrasonic transducer 117), but can be generated by a pump or by any other suitable system.

In a specific example, the wave-based coating weakening system can include an ultrasound machine. The ultrasound machine can include one or more ultrasonic emitters 116 and/or ultrasonic horns (e.g., with one or more transducers), central processing units, and control systems, but can additionally or alternatively include any other suitable component. In this embodiment, the transducer functions to produce the sound waves. The transducer area of the ultrasonic horn preferably has a transducer area of ~1 mm$^2$, but can have a transducer area larger than 1 mm$^2$, or smaller than 1 mm$^2$. The wave-based coating weakening system can include an array of ultrasonic emitters, a linear ultrasonic probe, areal ultrasonic probe, include an ultrasonic bath, and/or include any other suitable ultrasonic emitter. The frequency of the ultrasonic emitters is preferably a frequency and/or range thereof between 15-68 kHz, such as 25 kHz; however, any suitable frequency can be used. The intensity of the acoustic waves (e.g., ultrasonic waves) emitted by the ultrasonic emitters is preferably between 100-2400 W; however, any suitable intensity can be used.

In variants of the system, the wave-based coating weakening system can be operable between a contact and a non-contact mode. In the contact mode, the wave-based coating weakening system can directly contact (e.g., touch) the coating (and/or underlying layers). In the contact mode, the contact pressure (e.g., amount of pressure between the coating and the wave-based coating weakening system) is preferably less than 1 pound per square inch (PSI); however, the contact pressure can be greater than 1 PSI. The contact pressure can be controlled based on a set point (e.g., 1 PSI), based on the coating property (e.g., coating thickness, coating material), based on the dwell time, or otherwise controlled. In the non-contact mode, the wave-based coating weakening system can oppose the substrate across the coating (e.g., arranged above the coating) by a distance, such that the wave-based coating weakening system is indirectly coupled to the coating (e.g., via the coupling medium). The distance is preferably nonzero, but can additionally or alternatively can be zero. The distance can be: predetermined, determined based any suitable property associated with the coating (e.g., coating material, thickness, energy absorption, transmission, etc.), or otherwise determined. System operation in the contact and noncontact mode can be selected: manually, automatically, based on the coating properties, based on a removal parameter (e.g., removal speed or duration, removed coating intactness, ambient environment parameters, etc.), or otherwise selected. In a specific example, an ultrasonic emitter can be operable in the contact mode when the coating has a first coating property and can be operable in the noncontact mode when the coating has a second coating property, different from the first coating property. In this example, the coating properties can be a melting temperature, a vaporization temperature, an acoustic resonance frequency (e.g., plasmon resonance frequency), the coating thickness, the coating thermal conductivity, the coating thermal expansion coefficient, and/or any suitable coating properties. However, the mode can additionally and/or alternatively be selected based on interfacial properties, substrate properties, wave-based coating weakening system properties (the intensity, the maximum power, wavelength), time (e.g., duration of application, dwell time), and/or any suitable properties.

Figure 6A:
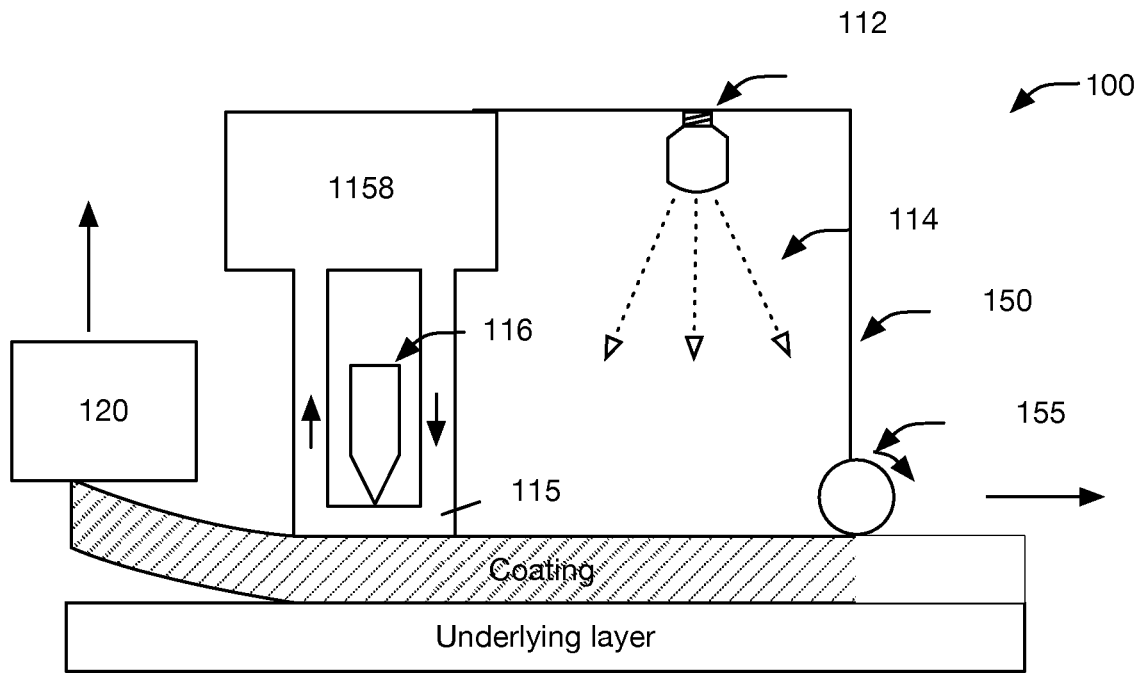
FIGS. 6A and 6B are schematic representations of embodiments of the system.
Figure 6B:
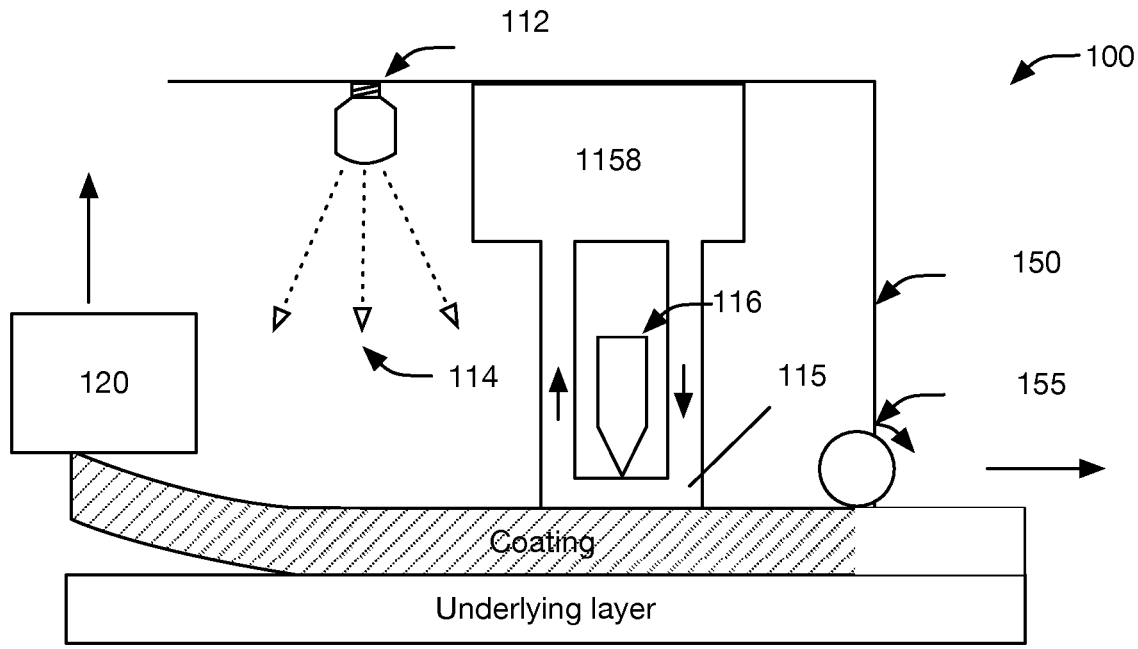

The system can include one or more coating weakening systems. As shown in FIGS. 6A and 6B, an example of the system includes one or more transverse coating weakening systems and one or more longitudinal coating weakening systems. However, the system can have one or more transverse coating weakening systems, one or more longitudinal coating weakening systems, and/or any other suitable combination of coating weakening systems. The coating weakening systems are preferably in communication with each other, but additionally or alternatively can be otherwise suitably configured. The coating weakening systems can be separated by a separation distance and/or range thereof between 0-10 m such as 6 cm; however, the coating weakening systems can have any suitable separation distance. The coating weakening systems can be operated simultaneously, asynchronously, with a time delay (e.g., a delay between operation of each coating removal system such as 0 s, 1 s, 2 s, 4 s, 10 s, 30 s, 60 s, 2 min, 5 min, 10 min, etc.), with a predetermined frequency, and/or in any suitable manner.

In embodiments of the system having at least one transverse coating weakening system and at least on longitudinal coating weakening system, the transverse coating weakening system and longitudinal coating weakening system can be separated by any suitable distance between 0-10 m (for example 10 cm). However, the transverse coating weakening system and longitudinal coating weakening system can be separated by any suitable distance. In these embodiments, transverse coating weakening system and longitudinal coating weakening system preferably operate simultaneously (e.g., on different coating location, on the same coating location). However, transverse coating weakening system can operate before and/or after longitudinal coating weakening system by any suitable time delay. In a first specific example of this embodiment, the transverse coating weakening system can precede or be arranged in front of the longitudinal coating weakening system (e.g., infrared illumination is applied before ultrasonication). In this specific example, the longitudinal coating weakening system can optionally function as a coating remover (e.g., coating removal mechanism) in addition to the coating weakening system. In a second specific example of this embodiment, the transverse coating weakening system can be arranged behind and follow the longitudinal coating weakening system (e.g., infrared illumination after ultrasonication). In this specific example, the coating weakening system configuration can function to have the longitudinal coating weakening system thin the coating, so that less material needs to weakened by the transverse coating weakening system. In a third specific example of this embodiment, the transverse coating weakening system can be applied simultaneously with the longitudinal coating weakening system (e.g., having the ultrasonic emitter include an infrared light source; have an ultrasonic emitter and an infrared light source arranged in parallel along a lateral axis and directed toward the same removal region). Additionally or alternatively, the transverse and longitudinal coating weakening systems configuration can depend on the coated sample (e.g., coating thickness, coating composition, etc.), the amount of time for the coating to be removed (e.g., want to have coating removed over entire surface in less than 1 hour), the desired quality of coating removal (e.g., degree of coating removal, uniformity of uncoated sample, etc.), and/or can have any suitable configuration.

The coating weakening system can optionally include one or more thermal coating weakening systems that can function to increase the temperature of the coating relative to the underlying layer (e.g., substrate, primer, other coating layers, etc.). The thermal coating weakening system preferably includes a noncontact heating mechanism (e.g., immersion heating, convection heating, radiative heating, etc.) that is configured to couple thermal energy to the coating without the thermal elements contacting the coating. However, the thermal coating weakening system can include a contact heating mechanism (e.g., thermal elements that touch the coating, such as resistive heaters). The thermal coating weakening system can be the same as and/or different from the wave-based weakening system. In a specific example, the thermal coating weakening system can include a convection heating mechanism. The convection heating mechanism can include one or more heating elements that can heat a coupling medium, wherein the coupling medium is in contact with the coating. However, any suitable heating mechanism can be used.

The temperature differential induced by the thermal coating weakening system can cause thermal expansion of the coating relative to the underlying layer (or vice versa), which can weaken the coating and/or the interface (e.g., interfacial bonds) between the coating and the underlying layer. The coating is preferably heated to a temperature less than the melting and/or vaporization temperature of the coating, but can additionally or alternatively be heated to any other suitable temperature. In a specific example, the coating can be heated to any suitable temperature less than 600° C. such as 300° C. The temperature differential can depend on a relative thermal property (e.g., heat capacity, specific heat, thermal conductivity, etc.) between the coating and the underlying layer (e.g., substrate), a duration of time (e.g., duration heating mechanism is applied, duration of time since heating was applied, etc.), a heating mechanism (e.g., temperature of the heating mechanism, operation mechanism, etc.), and/or can depend on any suitable property.

The coating weakening system preferably includes at least one power supply. The power supply preferably includes a battery, more preferably a secondary battery, but can additionally or alternatively can include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, power cord (e.g., to plug into a wall socket, USB, etc.), and/or any other suitable power source. However, the coating weakening system can additionally or alternatively include any other suitable power supply elements. The power source can be located onboard the coating weakening system (e.g., mounted to the housing, to the robot, etc.), be remote from the coating weakening system (e.g., connected to the system via a wired or wireless power connection), or be otherwise arranged relative to the system.

The coating weakening system can optionally include ablation reduction systems. The ablation reduction systems preferably function to minimize the amount of coating that is removed from the substrate and redeposits on the coating weakening system. The ablation reduction system is preferably collocated with the coating weakening system, but can additionally or alternatively be located at any suitable location. The ablation reduction system can include vacuum based (e.g., a vacuum shroud), environment based (e.g., wetting the coating surface, high humidity in the system, etc.), barrier based (e.g., protective shield between the coating and the coating weakening system), and/or can be configured in any suitable manner.

In variants, the system can optionally include a cutting mechanism that functions to cut the coating (e.g., weakened or unweakened coating) to match the size of the system (e.g., weakened coating extent, coating weakening system size, coating removal mechanism size, etc.) and/or facilitate the removal of the weakened coating. The cutting mechanism can be arranged after, in-line with, between, before, or be mounted to: the coating weakening system (e.g., the ultrasound system, the infrared system), the coating separation mechanism, and/or any other suitable system component. In examples, cutting mechanism(s) can be arranged: along the coating removal mechanism (e.g., friction wheel), along the sides of the housing, along the system longitudinal axis and between the coating weakening system and the coating separation mechanism, or otherwise arranged. In examples, the cutting mechanism can be a blade (e.g., razor, knife, etc.), a serrated blade, a wheel type cutter, a water jet, and/or any suitable cutting mechanism can be used. The position of the cutting mechanism (e.g., height above the coating) can be static and/or dynamically adjusted (e.g., based on coating properties).

The coating weakening system can optionally include one or more separators 111. The separators can separate (e.g., isolate) one coating weakening system from another coating weakening system; however, the separators can separate the coating weakening system from the sensors, from the coating removal mechanism, and/or from any suitable component. In a specific example, a separator can be used to generate separate housing compartments, such as an ultrasonic emitter compartment and a light source compartment. The compartments are preferably in fluid isolation (e.g., coupling medium from one compartment does not enter another compartment). However, the compartments can be in fluid communication. In variants, the separator(s) can be barriers (e.g., walls, splash guards, sleeves, etc.), rollers, brushes, squeegees/squilgees, suction mechanisms (e.g., vacuum), wipers, blades, mop, sponge, auger (e.g., screw auger), towel, blowers, and/or any suitable separator can be used. In a specific example, a wiper (e.g., squeegee) can be used to push coupling medium away from the weakened coating (e.g., between the coating removal mechanism and the coating weakening system).

3.2 Coating Removal Mechanism.

The coating removal mechanism 120 preferably functions to remove the coating from the underlying layer in a single unitary piece. However, the coating can be removed as shards, multiple unitary segments (e.g., longitudinally or laterally segmented), or in any suitable number and/or size of pieces. The coating removal mechanism is preferably applied to the substrate after the coating weakening system is applied (e.g., lag after the coating weakening system), more preferably applied immediately after the coating weakening system (e.g., within a predetermined time such as 1 s, 2 s, 4 s, 5 s, 10 s, 15 s, 60 s, etc.; within a predetermined distance such as 1 mm, 2 mm, 5 mm, 10 mm, 2 cm, 5 cm, 10 cm, etc.; etc.), but alternatively can be applied asynchronously with the coating weakening system. The coating removal mechanism is preferably integrated into a unitary housing with the coating weakening system, but can additionally or alternatively be a separate system.

The coating removal mechanism preferably operates automatically, but can additionally or alternatively operate semi-automatically (e.g., operate automatically for fixed amount of time, automatically based on human input, etc.), manually (e.g., operated by an operator, requires human input for the coating removal mechanism to function, etc.), and/or operate in any suitable manner. The coating removal mechanism can optionally collect the removed coating (e.g., permanently be attached to the coating, temporarily attach to the coating, place coating in a coating receptacle, etc.), but can additionally or alternatively not collect the coating and/or treat the removed coating in any suitable manner.

The coating removal mechanism preferably includes one or more: coating separation mechanisms and coating collection mechanisms, but can additionally or alternatively include any other suitable component.

The coating separation mechanism preferably includes one or more attachment mechanisms and one or more pulling mechanisms. However, the coating removal mechanism can include a washer (e.g., that washes away the coating), blower (e.g., that blows away the coating), scraper (e.g., razor blade, spatula, etc.), ablation mechanism (e.g., ultrasound machine, sand blaster, etc.), and/or any other suitable coating separation mechanism.

The attachment mechanism functions to attach the pulling mechanism to the coating. The attachment mechanism can couple to the coating at the top surface of the coating, at an edge of the coating, in the middle of the coating, and/or at any suitable locations on the coating.

Figure 4:
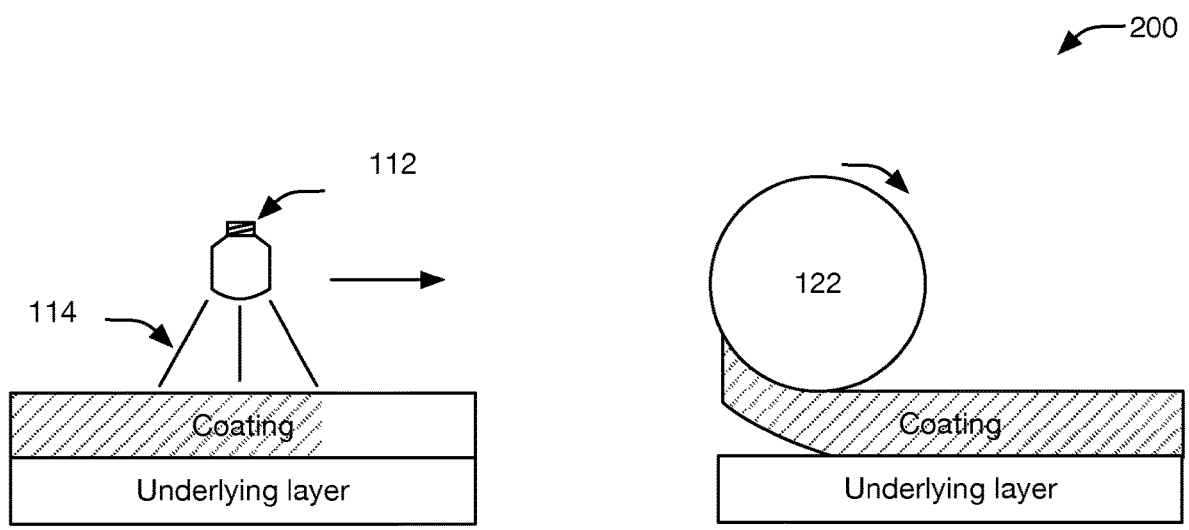
FIG. 4 is a schematic representation of an example coating removal mechanism.

The attachment mechanism is preferably a mechanical attachment mechanism (e.g., tweezer, hooks, robotic hand, etc.). However, the attachment mechanism can be an adhesion mechanism (e.g., tape, glue, gecko feet, adhesive, etc.), electrical (e.g., static electricity, electrical arc, magnetic, etc.), friction mechanism (e.g., friction wheel, example as shown in FIG. 4), suction (e.g., vacuum), and/or any other suitable attachment mechanism. In a specific example, the attachment mechanism is a pair of tweezers. The tweezers are used to grab the coating from an edge and lift the coating off of the substrate. In this example, once a predetermined area of coating has been removed, the area of coating can be cut off and the tweezers can be used to pick up a new area of coating to be removed. In this specific example, removing one area of coating at a time improves the quality of the coating removal.

The pulling mechanism functions to pull the coating off of the substrate. The pulling mechanism is preferably arranged after the attachment mechanism (e.g., along the direction of travel, proximal the trailing edge relative to the attachment mechanism), but can additionally or alternatively be part of the attachment mechanism or be arranged before the attachment mechanism. The pulling mechanism is preferably configured to apply a force on the coating normal to the substrate, but can additionally or alternatively apply a force at a predetermined angle (e.g., 30°, 45°, 60°, 135°, etc.) to the angle of travel, apply a lateral force (e.g., relative to the direction of travel, relative to the system's longitudinal axis, etc.), and/or apply a force in any other suitable direction. The applied force can be: predetermined (e.g., the same for all coatings), determined based on the coating properties (e.g., based on the tensile force of the removed coating), determined based on the coating removal properties (e.g., based on the amount of time before the coating reattaches to the underlying layer, etc.), or be any other suitable force. The pulling mechanism is preferably an actuator, more preferably an electrical actuator (e.g., powered by an electric motor), but can additionally or alternatively be a hydraulic actuator, pneumatic actuator, thermal actuator, magnetic actuator, mechanical actuator (e.g., rack and pinion), and/or any suitable actuator. However, the pulling mechanism can be a handle (e.g., wherein the coating can be removed by an operator) and/or be any suitable mechanism.

The pulling mechanism preferably operates with an intermittent timing, determined by the duration of the coating weakening system (e.g., the same as the duration of the coating weakening system, longer than the coating weakening system time, etc.). However, the pulling mechanism timing can be unrelated to the coating weakening system time, can be continuous (e.g., when system is in operation, pulling mechanism is operating), at a predetermined frequency (e.g., every 15 s, every 60 s, etc.), intermittently (e.g., with a changing frequency), and/or with any suitable timing.

In specific variants, the coating removal mechanism can include an ablation mechanism that can function to remove layers of coating (e.g., without contacting the coating). In a specific example, the ablation mechanism can include an ultrasound machine (e.g., including one or more ultrasonic horns) configured to generate a jet of coupling medium directed at the coating surface. In this specific example, the coating removal mechanism can be the same as the coating weakening system; however, the coating removal system and coating weakening system can be different. In this specific example, the coupling medium can be water, and the ultrasonic horn can direct high pressure and/or temperature water from the tip of the ultrasonic horn to the surface of the coating in contact with the coupling medium. The coupling medium and/or the ultrasound machine can remove the coating from the surface (e.g., via cavitation; pushing the coating, such as along the longitudinal axis of the sample, etc.). However, the ablation mechanism can be a pressurized jet (e.g., of water, of solvent, etc.) and/or can have any suitable configuration.

In a specific example, the coating removal mechanism can be a friction wheel 122. The system can include one or more friction wheels, arranged in series or in parallel (e.g., relative to the direction of system travel). In this specific example, the friction wheel can be attached to the coating (e.g., the weakened coating) by friction (e.g., static friction, kinetic friction, etc.). The coefficient of static friction can be predetermined and static, and/or depend on (e.g., be selected based on): the materials (e.g., the type of coating, the friction wheel material), the extent of the coating weakening, the speed of the system (e.g., how fast the system travels relative to the coating), coating properties (e.g., wetness, temperature, etc.), friction wheel roughness (e.g., surface roughness), and/or any suitable properties. The coefficient of static friction is preferably greater than 0.1; however, any suitable coefficient of static friction can be used. In this specific example, as the friction wheel moves (e.g., rotates), the weakened coating is preferably peeled away from the underlying layer (e.g., the friction between the coating and the friction wheel exceeds the friction between the coating and the underlying layer).

In a related example, the friction wheel can include one or more blades. The blade(s) can cut the weakened coating (e.g., to facilitate removal of the coating) and/or increase the friction/coupling between the friction wheel and the coating. The blade preferably extends beyond the friction wheel by a blade distance, wherein the blade distance can be: predetermined; equivalent to, less than, or more than the coating thickness; or be any other suitable distance. In a specific example, the blade can radially extend outward, along an axial portion of the friction wheel at one or more arcuate positions, wherein the blade cuts the weakened coating into lateral segments (e.g., perpendicular the direction of travel) when the blade contacts the coating. In a second specific example, the blade can be arranged perpendicular the friction wheel axis and/or parallel the friction wheel cross section (e.g., extend around the friction wheel and be arranged at an axial position; be arranged along a side of the friction wheel; etc.), wherein the blade cuts the weakened coating into longitudinal segments (e.g., parallel with the direction of travel) when the friction wheel contacts the coating. However, the blade can be otherwise configured and arranged.

In variants, the coating removal mechanism can optionally include a coating reservoir configured to collect, store, and/or process the removed coating. After removal from the sample, the coating removal mechanism (e.g., pulling mechanism, attachment mechanism) can deposit the removed coating in the coating reservoir. The removed coating can be deposited into the coating reservoir by: a material feed from the friction wheel, suction (e.g., wherein the removed coating is sucked into the coating reservoir), manual action (e.g., a user places the removed coating into the coating reservoir), by an augur, or by another transport mechanism. The coating reservoir can optionally include one or more solvents (e.g., water, soap, surfactant, etc.). The coating reservoir solvents can be used, for example, to wash the removed coating to prepare the removed coating to be recycled, reused, and/or disposed of. The coating reservoir preferably stores the coating as a single, unitary piece. However, the coating reservoir can store the coating in any suitable number and/or size of pieces.

3.3 Sensor.

The system can optionally include one or more sensors 130. The sensors 130 preferably function to measure properties associated with the coating and/or sample (e.g., coating thickness, substrate quality, coating composition, contact pressure, etc.) but can additionally or alternatively measure operation properties, ambient environment properties, and/or any other suitable property. The sensors are preferably arranged at the leading edge of the housing (e.g., in front of the coating weakening system); however, the sensors can additionally and/or alternatively separate from the housing, integrated into any suitable system component (e.g., coating weakening system, coating removal mechanism, etc.), be arranged between system components (e.g., between two coating weakening systems, between coating weakening system and coating removal system, etc.), next to system components, and/or arranged in any suitable manner.

Sample properties preferably include coating(s) parameters and substrate parameters, but can additionally or alternatively include any other suitable information. Coating parameters preferably include coating thickness (e.g., uniform thickness, average thickness, local coating thickness, map of coating thickness across the sample, etc.), numerosity (e.g., one, two, multiple coatings, etc.), coating composition (e.g., material, hydration state, polymer average molecular weight, etc.), coating quality (e.g., uniformity, existence of islands, surface coverage, surface roughness, etc.), extent of coating weakening (e.g., temperature, degree of ablation, etc.), force (e.g., force necessary to pull coating off), pressure (e.g., contact pressure), and/or any other suitable information. Substrate parameters preferably include substrate thickness, quality (e.g., uniformity, surface coverage, surface roughness, etc.), composition (e.g., metal such as Aluminum, composite materials, etc.), and/or any other suitable information. Operation properties can include: system height, system pressure, system temperature, system speed, system velocity or acceleration, system dispensation rate, and/or any other suitable operation parameter. Ambient environment properties can include: ambient temperature, pressure, humidity, light, and/or any other suitable ambient environment parameter.

The sensors can preferably include one or more sensors such as: interference sensor (e.g., measure the interference of electromagnetic radiation at a given wavelength), surface sensor (e.g., cantilever, atomic force microscope, scanning probe microscope, profilometer, etc.), indentation sensor (e.g., Rockwell instrument, microindentation, etc.), ellipsometer, force sensor (e.g., scale), sender/receiver pairs (e.g., detect how much light is reflected from the sample at a given wavelength), rulers (e.g., calipers, ruler, tape measurer, micrometer, etc.), acoustic waves (e.g., ultrasonic waves), thermometer (e.g., Raman thermometer, Hg thermometer, ethanol thermometer, IR thermometer, etc.), pressure sensor (e.g., piezoelectric, pressure transducer, mechanical pressure sensor, etc.), coating thickness sensors (e.g., magnetic sensors such as magnetic pull-off, induction sensors, etc.; eddy current sensors, ultrasonic sensors, micrometers, destructive sensors, gravimetric sensors, etc.), and/or include any other suitable sensor. In some embodiments of the system, the same source for the wave-based coating weakening system can also be used as the wave source for the sensor(s).

The sensors are preferably mounted to the same unitary housing as the bond weakening system and coating removal mechanism, but can additionally or alternatively be mounted to a separate housing. The sensors can be arranged: in front of the coating weakening system, between the coating weakening system and the coating removal mechanism, after the coating removal mechanism, be collocated with the coating weakening system and/or coating removal mechanism, or be otherwise located.

The sensors are preferably communicably coupled to the coating removal mechanism and the coating weakening system, but can additionally or alternatively be communicably coupled to either the coating removal mechanism or the coating weakening system, communicably coupled to neither, and/or be communicably coupled to any suitable component.

The parameters measured by the sensors (e.g., measurements) can be used: to set the initial operation parameters (e.g., for the wave based coating weakening system), dynamically control the operation parameters, monitor system operation (e.g., monitor whether the coating was removed), and/or otherwise used. In embodiments of the system, data collected by the sensors can be used in a feedback loop for the coating weakening system and/or the coating removal mechanism and/or any other suitable element.

The sensors can measure the sample: during coating weakening, after coating weakening, during coating removal, after coating removal, at preprogrammed timings, continuously, and/or at any other suitable time.

In a first example, the system can: measure the sample properties (e.g., material type; highly-absorbed wavelengths, etc.) with the sensors before applying the coating weakening system; and determine the coating weakening system parameters (e.g., wave parameters, operation instructions) based on the sample properties. In a second example, the system can: measure the sample properties with the sensors after applying the coating weakening system but before applying the coating removal mechanism. In this example, the sensor data can be used to determine if the bonds have been sufficiently weakened to have the coating removal mechanism remove the coating. In a third example, the system can measure the sample properties after applying the coating removal mechanism. In this example, the sensors can be used to determine the quality and extent to which the coating was removed. This data can then be used to determine whether the system should move to a new area of the sample or if the same area needs to have its coating stripped again.

In a first variant, the sensors can measure the properties association with the coating over a given region of the coating. In these variants, a map of the properties (e.g., properties at each location of the sample) can be generated. The map of the properties can be used to generate a map of operation parameters (e.g., system operation parameters associated with each location of the sample).

In a second variant, the sensor(s) can be located at the leading edge of the housing. The sensors can be used to measure the properties associated with the coating and/or sample before the coating weakening system weakens the coating (e.g., immediately before). However, the sensors can be used in any suitable manner.

3.4 Housing.

The housing 150 preferably functions to support one or more components of the system. The housing can optionally provide a controlled environment for coating treatment. The housing preferably defines a top, sides, and a bottom; however, the housing can define any suitable surfaces. One or more of the sensors, computing system, coating weakening system(s), and/or coating removal mechanisms can be connected to the top, bottom, and/or side of the housing. However, the components can be connected in any suitable manner. The housing can define an opening opposing the top of the housing. However, the opening can be in the top of the housing, oppose a side of the housing, oppose the bottom of the housing, and/or be defined in any suitable manner. In operation, the opening is arranged proximal to the coating; however, the opening can arranged distal to the coating, and/or in any suitable manner. In some variants, the opening can optionally include (e.g., be enclosed by) a window transparent to the coating weakening system mechanism. In variants, the system can include one or more housings. In these variants, all or part of one or more of: the sensors, coating weakening systems, coating removal mechanisms, computing systems, and/or coating systems can be coupled to each housing. However, the housings can be coupled to any suitable component.

In variants, the housing is preferably coupled to each component via one or more bias mechanisms. The components can be mounted to the housing by the same or different bias mechanisms. The bias mechanism can be a spring (e.g., set of springs), actuator, micrometer, screw, guides, plunger (e.g., spring plunger), and/or any suitable bias mechanism. The bias mechanism is preferably configured to bias the components toward the coating (e.g., toward the opening), thereby modifying a separation distance between the coating and the components. However, the bias mechanism can bias the components tangentially to the coating, away from the coating, and/or in any suitable direction. The bias mechanism can access continuous and/or discrete positions. The bias mechanism operation is preferably automatic. However, the bias mechanism can be operated manually, semi automatically, and/or in any suitable manner. The bias mechanism is preferably passive, but can additionally or alternatively be active (e.g., controlled by a processing or control system). However, one or more components can be coupled to the housing via fasteners, adhesives, and/or in any suitable manner.

In a specific example, as shown in FIG. 10A, the housing preferably includes a set of treads 157 along the sides. The opening, defined by the housing, can be between the treads 157. In this example, the light emitters, ultrasonic emitters, and friction wheel can be coupled to the top of the housing (e.g., to the housing interior) via separate bias mechanisms. One or more sensors can be included at the front of the housing. However, the housing can be arranged in any suitable manner.

The system (and/or housing) can optionally include a movement systems that functions to move the system over the surface of the sample. Alternatively or additionally, the movement system can be configured to move the sample relative to the system. The movement system preferably moves the system relative to the sample at a rate determined by the sample properties and the coating weakening system parameters (e.g., wave parameters). However, additionally or alternatively the rate of movement can be predetermined (e.g., a static rate, according to a programmed curve, etc.), stepwise (e.g., move a fixed amount then wait an amount of time before moving again), dynamically determined (e.g., based the sample properties, the coating weakening system parameters, etc.), continuous (e.g., continuously move the sample relative to the system), and/or with any suitable rate. The movement system is preferably an actuator, more preferably an electrical actuator (e.g., a motor). However, additionally or alternatively the movement system can be a mechanical actuator (e.g., torsion spring), hydraulic actuator, pneumatic actuator, thermal actuator, magnetic actuator, and/or any suitable actuator. Examples of the movement system include: a robot that navigates over the surface of the sample, a gantry, a set of treads coupled to the housing, wheels, or any other suitable movement system. The actuation mechanism(s) is preferably mounted to the housing, but can additionally or alternatively be mounted to the coating weakening system and/or any other suitable component.

In some variants, the system can include one or more computing systems 140. The computing systems preferably communicate with and/or control the coating weakening system, coating removal mechanism, and/or the sensors (e.g., via one or more communication modules, preferably wireless communication modules), but can be otherwise configured. The computing system functions to determine the system operation parameters based on the properties associated with the coating. The coating properties can be determined: from a user (e.g., manually entered), from a specification for the sample, from the sensor measurements, or otherwise determined. The computing systems can include remote computing systems (e.g., network-connected servers), local computing systems (e.g., on-board the system), operator devices (e.g., smartphones, tablets, etc.), and/or any other suitable set of computing systems. However, the system can include any suitable set of computing systems.

In a specific example as shown in FIG. 6, when the sample contains more than one coating (e.g., polyimide and more than one type of polyurethane, etc.) the coating weakening system parameters can be set (e.g., by an operator, to match a desired specification, based on the system parameters, etc.) to weaken the bonds in a predetermined location (e.g., the top most layer, the interface between any two coating layers, the interface between the coating and the underlying layer, between the coating and the substrate, etc.), and/or in any suitable location of the sample. The coating removal mechanism would then be configured to remove the coating(s) from the interface where the coating weakening system weakened the bonds.

In a specific example wherein the sample includes two coating layers, one coating layer can be a primer (e.g., forms a strong bond to the substrate and acts as an intermediate layer between the coating and substrate) and the top layer can be another material (e.g., polyurethane). In this specific example, the coating weakening system parameters may be set to weaken the bonds between the coating layer and the primer (e.g., wherein the emitted wavelengths are selectively absorbed by the coating layer, and/or the primer is transparent or translucent to the emitted wavelengths). In this example, the coating removal mechanism would be configured to remove the coating layer, leaving the primer behind. In this example, after coating removal, the coating system can deposit a new coating layer over the primer layer, without depositing a primer layer first.

In some variants, the system includes a coating system. The coating system functions to apply one or more coatings to the sample. The coating system is preferably arranged behind the coating removal mechanism, but can additionally or alternatively be arranged before the coating weakening system, or arranged at any suitable location. The coating system can include chemical deposition systems (e.g., solution deposition, spin coating, dip coating, etc.), physical deposition systems (thermal evaporator, electrospray, etc.), or any other suitable coating system.

4. Method.

The method preferably includes weakening the coating S210 and removing the coating S220, but can additionally or alternatively include determining sample properties S205, checking the sample after coating removal, reapplying coatings (and/or primers) S230, and/or any other suitable elements.

Figure 7:
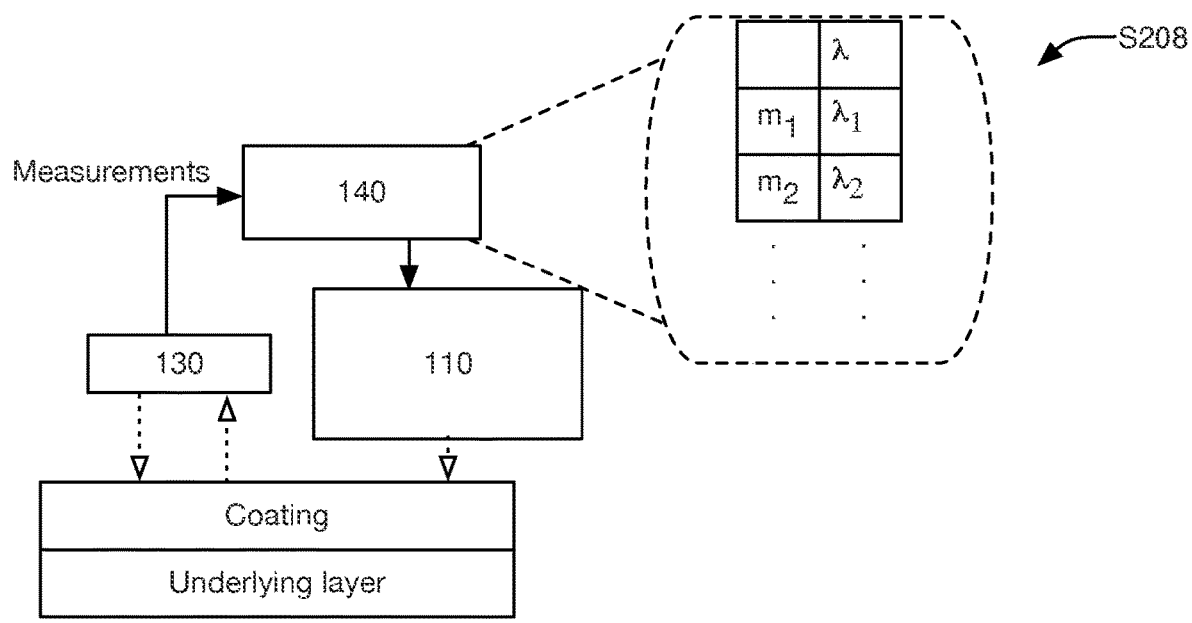
FIG. 7 is a schematic representation of an example of a system for determining sample properties.

The method optionally includes determining properties associated with the coating and/or sample (e.g., sample properties), for example as shown in FIG. 7. Determining properties functions to identify characteristics (e.g., properties) of the sample (e.g., as described above). Determining properties preferably occurs before weakening the coating, but additionally or alternatively can occur simultaneously with and/or after weakening the coating. Determining the properties is preferably performed by sensors (e.g., as described above), but additionally or alternatively can be received from a user or otherwise performed.

In a first variant, determining the properties can be performed once. In an example of this variant, determining the properties can include measuring a map of the properties (e.g., sample properties) before weakening the coating. In this example, the map can correspond to properties measured across the coated sample surface (e.g., specify the sample properties for each sample location or region). The map can be used to determine system operation parameters (e.g., a map of system operation parameters). However, the map can be used in any suitable manner. The map can be determined: during coating treatment (e.g., for the upcoming sample region), before coating treatment, or at any other suitable time. In a second specific example, the properties can be measured at a single location of coated sample. These properties can then be used for the entire coated sample.

In a second variant, determining the properties can be performed immediately before weakening the coating. In a specific example, a sensor can be mounted in front of the coating weakening system on the same housing. The sensor can be used to measure the properties at a location adjacent to and in front of the currently operated on location. The coating weakening system can then be used at the location (e.g., upon movement of the system).

In a third variant, the coating weakening system (e.g., wave-based coating weakening system such as light sources, IR light emitters, electromagnetic radiation, ultrasonic emitters, acoustic waves, ultrasonic waves, etc.) can be used to determine the properties. In an example of the third specific example, a sensor can be coupled to the coating weakening system.

In fourth variant, the properties can be iteratively determined. For example, the coating region can be treated, then retreated when the separation force is higher than a threshold force (e.g., wherein the threshold force can be predetermined, specified by the coating removal mechanism, or otherwise determined).

However, the properties can be determined in any suitable manner.

Determining properties can include determining system parameters S208 (e.g., system operation parameters), wherein the system is operated according to the system operation parameters. The system operation parameters can include coating weakening system parameters, coating removal mechanism parameters, and/or any suitable parameters. The system operation parameters are preferably determined based on the properties associated with the coating, but can additionally or alternatively be retrieved from a database (e.g., based on the coating material, coating thickness, etc.), or otherwise determined.

The system operation parameters can include: position (e.g., x/y/z; relative position such as relative to the coating, opening, to other components, etc.; etc.), orientation (e.g., $\Theta$, $\varphi$; relative orientation such as relative to the coating, to the coated sample, to the opening, to other components, etc.; etc.), power output (e.g., maximum power output), amplitude, frequency, wavelength, percentage of maximum power output (e.g., 1%, 5%, 10%, 20%, 30%, 40%, 50%, 60%, 70%, 80%, 90%, 95%, 99%, 100%, etc.), duration of operation (e.g., 1 s, 2 s, 4 s, 6 s, 8 s, 10 s, 12 s, 16 s, 20 s, 30 s, 60 s, 120 s, etc.), duration since operation (e.g., the amount of time between weakening the coating and removing the coating such as 1 s, 2 s, 4 s, 10 s, 20 s, 30 s, 60 s, 2 min, 5 min, 10 min, 20 min, 30 min, 1 hr, etc.), power density, wave-spot size, wave focal distance, speed (e.g., relative speed of the system relative to the coating), mode of operation (e.g., contact mode, noncontact mode), coupling medium (e.g., type, presence, amount, etc.), and/or any other suitable operation parameter.

The system operation parameters can be predetermined, dynamically determined (e.g., based on a feedback loop, iteratively, etc.), or otherwise determined. The system operation parameters can be: calculated, selected (e.g., from a lookup table), predetermined, or otherwise determined. The system operation parameters are preferably determined based on the current sample properties (e.g., sample properties related to a specific location of the sample), but can additionally or alternatively be determined based on target sample properties, previous sample properties, be unrelated to the sample properties, and/or by any other suitable means.

In a specific example, the coating weakening parameters can be set based on the specific material composition of the coating. In another specific example, the coating weakening parameters can be set to weaken bonds based on a predetermined coating thickness (e.g., a target coating thickness, an thickness of coating to remove, a thickness of coating to leave on the sample, etc.). In another specific example the coating weakening parameters can be set to different values for different locations across the sample surface (e.g., set to match different coating thicknesses at different locations on the sample). In a fourth specific example, the system operation parameters can be determined from a look-up based on the properties associated with the system. In a fifth specific example, the system operation parameters can be learned (e.g., machine learning) based on a coating removal dataset, where the coating removal dataset can include system operation parameters, extent of coating removal, properties associated with the coating, and/or any suitable information/data. However, the system operation parameters can be determined in any suitable manner.

Weakening the coating preferably functions to decrease a coupling force between the coating and an underlying layer such as by weaken the bonds between the sample layers (e.g., between coatings, between the coating and the primer, between the coating and the substrate). This can function to decrease the force required to remove a coating from the sample. Weakening the coating bonds is preferably performed by the coating weakening system, but can additionally or alternatively be performed by any suitable element.

Weakening the coating bonds can include: illuminating the coating (and/or sample), inducing cavitational wear on the sample (e.g., at the coating surface, within the coating body, at the coating interfaces, etc.), transmitting acoustic waves (e.g., from the ultrasonic emitter) to the coating (and/or sample) and/or any suitable substeps. Illuminating the sample with electromagnetic waves is preferably performed by the transverse coating weakening system but can additionally or alternatively be performed by any suitable element. Inducing cavitational wear on the sample and/or transmitting acoustic waves to the coating are preferably performed by the longitudinal coating weakening system, but can additionally or alternatively be performed by any suitable element.

In some variants, weakening the coating bonds can include using feedback loops to determine coating weakening system parameters. Using the feedback loop preferably includes measuring sample properties (e.g., at one or more sensor(s)) and setting coating weakening system parameters (e.g., updating coating weakening system parameters) based on the current sample properties, but can additionally or alternatively include any suitable elements. The coating weakening system parameters can be determined from the sample properties based on a look-up table, according to an equation (e.g., linear, logarithmic, trigonometric, etc.; variables can include: coating thickness, power, wavelength, time, coating composition, etc.), based on machine learning algorithms (e.g., based on data from coating weakening measurements on many samples), manually input (e.g., operator sets operation parameters based on sensor readings), based on a set of rules, and/or in any other suitable manner. In variants with more than one coating weakening system, the coating weakening system parameters are preferably set according to a separate feedback loop for each coating weakening system, but additionally or alternatively can use the same feedback loop, based on the type of coating weakening system (e.g., transverse waves, longitudinal waves, thermal, etc.), and/or share the feedback loop in any suitable manner.

In a specific example, the feedback loop is preferably initiated before the coating weakening occurs. The feedback loop is preferably operated in a test region of the sample. The sample properties are measured and coating weakening system parameters can be set based on those sample properties. The bond weaken system is operated with these coating weakening system parameters in the test region. The degree of coating weakening in the test region is measured (e.g., by the sensors). Based on the degree of coating weakening, the coating weakening parameters can be updated. In this example, this process is repeated until suitable coating weakening parameters (e.g., coating weakening parameters meeting predefined criteria such as an extent of coating removal, thickness of coating removal speed of coating removal, speed of system operation, etc.; predicted to remove full coating thickness; etc.) have been determined.

Removing the coating preferably functions to remove the coating (e.g., weakened coating) from the sample. The coating is preferably removed in a unitary piece, but can additionally or alternatively be removed in segments, shards, or in any other suitable form factor. Removing the coating is preferably performed after weakening the coating; more preferably immediately (e.g., within 1 s, 2 s, 4 s, 6 s, 8 s, 10 s, 15 s, 30 s, 1 min, 2 min, etc.) after weakening the coating. However, the coating can be removed more than a threshold time duration after coating weakening (e.g., more than 1 second, 2 seconds, 10 seconds, 30 seconds, 1 minute, etc.), or be removed at any other suitable time. Removing the coating is preferably performed by the coating removal mechanism, but can additionally or alternatively be performed by any suitable element. Removing the coating preferably includes attaching the coating removal system to the weakened coating and pulling the coating off, but can additionally or alternatively include collecting the removed coating and/or any other suitable steps. Attaching to the coating is preferably performed by the attachment mechanism but can additionally or alternatively be performed by any suitable element. Pulling the coating off is preferably performed by the pulling mechanism, but can additionally or alternatively be performed by any suitable element.

In some variants, the method can include checking the sample after coating removal. Checking the sample after coating removal functions to determine the degree (e.g., extent) of coating removal (such as percentage of coating removed) and the quality of the remaining sample (e.g., surface roughness of the remaining sample, amount of coating remaining on the underlying layer, etc.). Checking the sample after coating removal is preferably performed by sensors, but can additionally or alternatively be performed by any suitable element. In a specific example, checking the sample after coating removal can function as the input to a feedback loop. In this specific example, based on the quality of the remaining sample (e.g., uniformity of coating removal, thickness of remaining coating, etc.), weakening the coating and removing the coating can be repeated over the same sample area (e.g., with the same coating weakening system parameters, with updated coating weakening parameters based on current sample properties, etc.) until the quality of the remaining sample meets a specification (e.g., coating thickness is less than a target value, sample uniformity is greater than a target value, etc.).

In some variants, the method can include reapplying a coating to the sample. Reapplying a coating to the sample functions to cover the sample with a new coating. Reapplying a coating preferably occurs after removing the coating. Reapplying the coating is preferably performed by a coating system, but can additionally or alternatively be performed by any suitable element. The new coating can be one or more coating layers. The new coating can have the same or different coating properties relative to the original coating.

In a first specific example of the technology, a system for removing a coating from an underlying layer can include a wave-based weakening system configured to weaken the coating by decreasing a coupling force between the coating and the substrate. The wave-based weakening system can be connected to a housing. The wave-based weakening system can be configured to direct radiation (e.g., transverse waves such as electromagnetic radiation, longitudinal waves such as acoustic wave, etc.) toward an opening defined by the housing. The housing can additionally support a coating removal mechanism configured to remove the weakened coating from the underlying layer. The coating removal mechanism can be separate from and/or the same as the wave-based weakening system. The coating removal mechanism can be configured to remove the coating in a unitary piece and/or in multiple separate pieces. The housing can additionally support a sensor (for example in front of the wave-based weakening system). The sensor can be configured to determine a property associated with the coating. At least one system operation parameter can be determined based on the property.

In a second specific example, a system for removing a coating from an underlying layer can include a housing defining an opening. The opening can be configured to be adjacent to the coating. A light source can be coupled to (e.g., supported by) the housing. The light source can be configured to emit electromagnetic radiation directed toward the opening. The light source can include an infrared (IR) light source. The electromagnetic radiation (e.g., emitted by the IR light source) can be IR radiation (e.g., wavelength between 0.7-1000 µm). A portion of the IR radiation can be matched to an absorption (e.g., resonance) of the sample (e.g., coating). The IR light sources can include a short-wavelength IR cassette (e.g., set of light sources configured to emit IR radiation with wavelength between 0.7-3 µm) and a mid-wavelength IR cassette (e.g., a set of light sources configured to emit IR radiation with wavelength between 3-8 µm). The housing can include a separator between the light source and the ultrasonic emitter. The short-wavelength IR cassette, med-wavelength IR cassette can operate simultaneously and/or asynchronously. In a variation of this example, a long-wavelength IR cassette (e.g., a set of light sources configured to emit IR radiation with wavelength between 8-15 µm) can be included. In this variation, the long-wavelength IR cassette can operate simultaneously with and/or asynchronously with the short-wavelength IR cassette and/or the med-wavelength IR cassette. In this specific example, an ultrasonic emitter can be coupled to the housing. The ultrasonic emitter can be configured to emit ultrasonic waves directed toward the opening of the housing. The ultrasonic emitter can be operable in a contact mode, wherein the ultrasonic emitter directly contacts the coating and a noncontact mode wherein the ultrasonic emitter is a distance above the coating. The ultrasonic emitter can be operable in the contact mode when the coating has a first coating property and can be operable in the noncontact mode when the coating has a second coating property. The ultrasonic emitter can include a pressure sensor. The pressure sensor can be configured to measure a contact pressure between the ultrasonic emitter and the coating. The system can include a coupling medium reservoir configured to store a coupling medium. The coupling medium reservoir can be in fluid communication with a coupling medium dispenser. The coupling medium dispenser can include an outlet arranged in front of the ultrasonic emitter. The coupling medium dispenser can dispense coupling medium in front of the ultrasonic emitter. The coupling medium can couple (e.g., indirectly) the ultrasonic emitter (e.g., acoustic waves, etc.) to the coating. In this example, the system can include a coating removal mechanism configured to remove the coating from the underlying layer. The coating removal mechanism can be coupled to the housing. In this specific example, the coating removal mechanism can be separate from and/or identical to the ultrasonic emitter. The coating removal mechanism can be a friction wheel and/or a grip and pull tool. In this specific example, the system can include a sensor. The sensor can be configured to determine a property associated with the coating. A system operation parameter can be determined based on the property associated with the coating. In this specific example, the sensor can be in front of the ultrasonic emitter; the ultrasonic emitter can be in front of the light source; and the light source can be in front of the coating removal mechanism. However, the components can be arranged in any suitable order. In this example, the light source, the ultrasonic emitter, and the coating removal mechanism can each be coupled to the housing by a set of springs biasing the light source, the ultrasonic emitter, and the coating removal mechanism toward the opening. In this example, the housing can be supported by a robotic arm 153 (e.g., having six degrees of freedom). However, the system can be arranged in any suitable manner.

In a third specific example, a method for removing a coating from an underlying layer can include generating a weakened coating and removing the weakened coating. The method can include measuring a property associated with the coating. In this example, the weakened coating can be generated by a wave-based coating weakening system. Generating a weakened coating can include illuminating the coating with electromagnetic radiation from a light source. Illuminating the coating can include heating the coating. The coating can be heated to a temperature below the vaporization temperature of the coating, to a temperature below a degradation temperature of the coating, to a temperature that does not adversely impact the underlying layer (e.g., the substrate), and/or to any suitable temperature. Illuminating the coating can include adjusting a wavelength of the electromagnetic radiation based on the property. The light source can be an infrared (IR) light source. The electromagnetic radiation can correspond to an absorption of the coating. In this example, generating a weakened coating can include transmitting acoustic waves from an ultrasonic emitter to the coating. The method can include dynamically adjusting a separation distance between the coating and at least one of the light source and the ultrasonic emitter based on the property associated with the coating. Removing the coating can remove the weakened coating in a unitary piece. The method can include repeating generating the weakened coating and removing the coating for each location of the coating.

However, the system and/or method can be arranged and/or performed in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for removing a coating from an underlying layer, the system comprising:
   a housing defining an opening, wherein the opening is configured to be adjacent to the coating;
   a light source configured to emit electromagnetic radiation directed toward the opening, wherein the light source is coupled to the housing;

an ultrasonic emitter configured to emit ultrasonic waves directed toward the opening, wherein the ultrasonic emitter is coupled to the housing;

a coating removal mechanism configured to remove the coating from the underlying layer, wherein the coating removal mechanism is coupled to the housing; and a sensor configured to determine a property associated with the coating, wherein a system operation parameter is determined based on the property;

wherein the ultrasonic emitter is operable between:

a contact mode wherein the ultrasonic emitter directly contacts the coating; and a noncontact mode wherein the ultrasonic emitter is a distance above the coating.

2. The system of claim 1, wherein the ultrasonic emitter is operable in the contact mode when the coating has a first coating property and is operable in the noncontact mode when the coating has a second coating property, different from the first coating property.

3. The system of claim 1, wherein the sensor is coupled to the ultrasonic emitter, wherein the sensor comprises a pressure sensor configured to measure a contact pressure between the ultrasonic emitter and the coating.

4. The system of claim 1, wherein the ultrasonic emitter is separate from the coating removal mechanism.

5. The system of claim 1, further comprising:

a coupling medium reservoir; and a coupling medium dispenser in fluid communication with the coupling medium reservoir, the coupling medium dispenser comprising an outlet arranged in front of the ultrasonic emitter.

6. The system of claim 5, further comprising a separator between the outlet and the light source.

7. The system of claim 1, wherein the light source comprises an infrared (IR) light source, wherein the electromagnetic radiation is IR radiation, wherein a portion of the IR radiation can be matched to an absorption of the coating.

8. The system of claim 7, wherein the IR light source comprises at least one of a short-wavelength IR cassette, a mid-wavelength IR cassette, and a long-wavelength IR cassette; wherein the short-wavelength IR cassette emits optical radiation with a wavelength between 0.7 and three micrometers (μm); wherein the mid-wavelength IR cassette emits optical radiation with a wavelength between three and eight μm; and wherein the long-wavelength IR cassette emits optical radiation with a wavelength between eight and fifteen μm.

9. The system of claim 8, wherein the short-wavelength IR cassette is simultaneously operable with the mid-wavelength IR cassette.

10. The system of claim 1, wherein the coating removal mechanism comprises a friction wheel.

11. The system of claim 1, wherein the sensor is mounted to a leading end of the housing, wherein the ultrasonic emitter is behind the sensor, wherein the light source is behind the ultrasonic emitter, and wherein the coating removal mechanism is behind the light source.

12. The system of claim 1, wherein the light source, the ultrasonic emitter, and the coating removal mechanism are coupled to the housing by a set of springs biasing the light source, the ultrasonic emitter, and the coating removal mechanism toward the opening.

13. The system of claim 1, wherein the housing is supported by a robotic arm comprising six degrees of freedom.

14. A system for removing a coating from an underlying layer, the system comprising:

a housing defining an opening, wherein the opening is configured to be adjacent to the coating;

a light source configured to emit electromagnetic radiation directed toward the opening, wherein the light source is coupled to the housing;

an ultrasonic emitter configured to emit ultrasonic waves directed toward the opening, wherein the ultrasonic emitter is coupled to the housing;

a coating removal mechanism configured to remove the coating from the underlying layer, wherein the coating removal mechanism is coupled to the housing;

a sensor configured to determine a property associated with the coating, wherein a system operation parameter is determined based on the property;

a coupling medium reservoir; and a coupling medium dispenser in fluid communication with the coupling medium reservoir, the coupling medium dispenser comprising an outlet arranged in front of the ultrasonic emitter.

* * * * *

UNITED STATES PATENT AND TRADEMARK OFFICE
CERTIFICATE OF CORRECTION

PATENT NO. : 11,998,958 B2
APPLICATION NO. : 17/296902
DATED : June 4, 2024
INVENTOR(S) : Jaspreet Dhau It is certified that error appears in the above-identified patent and that said Letters Patent is hereby corrected as shown below:

In the Claims

Column 28, Line 39, In Claim 14, delete "reservior;" and insert --reservoir;-- therefor Signed and Sealed this
Sixteenth Day of July, 2024

Katherine Kelly Vidal
*Director of the United States Patent and Trademark Office*